Sept. 1, 1925.

B. D. CHAMBERLIN 1,551,933

MACHINE FOR THE PRODUCTION OF GLASS ARTICLES

Filed March 23, 1910    21 Sheets-Sheet 5

Witnesses:
Albert L. Krey
Paul L. Webb

Inventor,
Benjamin D. Chamberlin.
by Vernon M. Dorsey
his Attorney.

Sept. 1, 1925. 1,551,933
B. D. CHAMBERLIN
MACHINE FOR THE PRODUCTION OF GLASS ARTICLES
Filed March 23, 1910 21 Sheets-Sheet 6
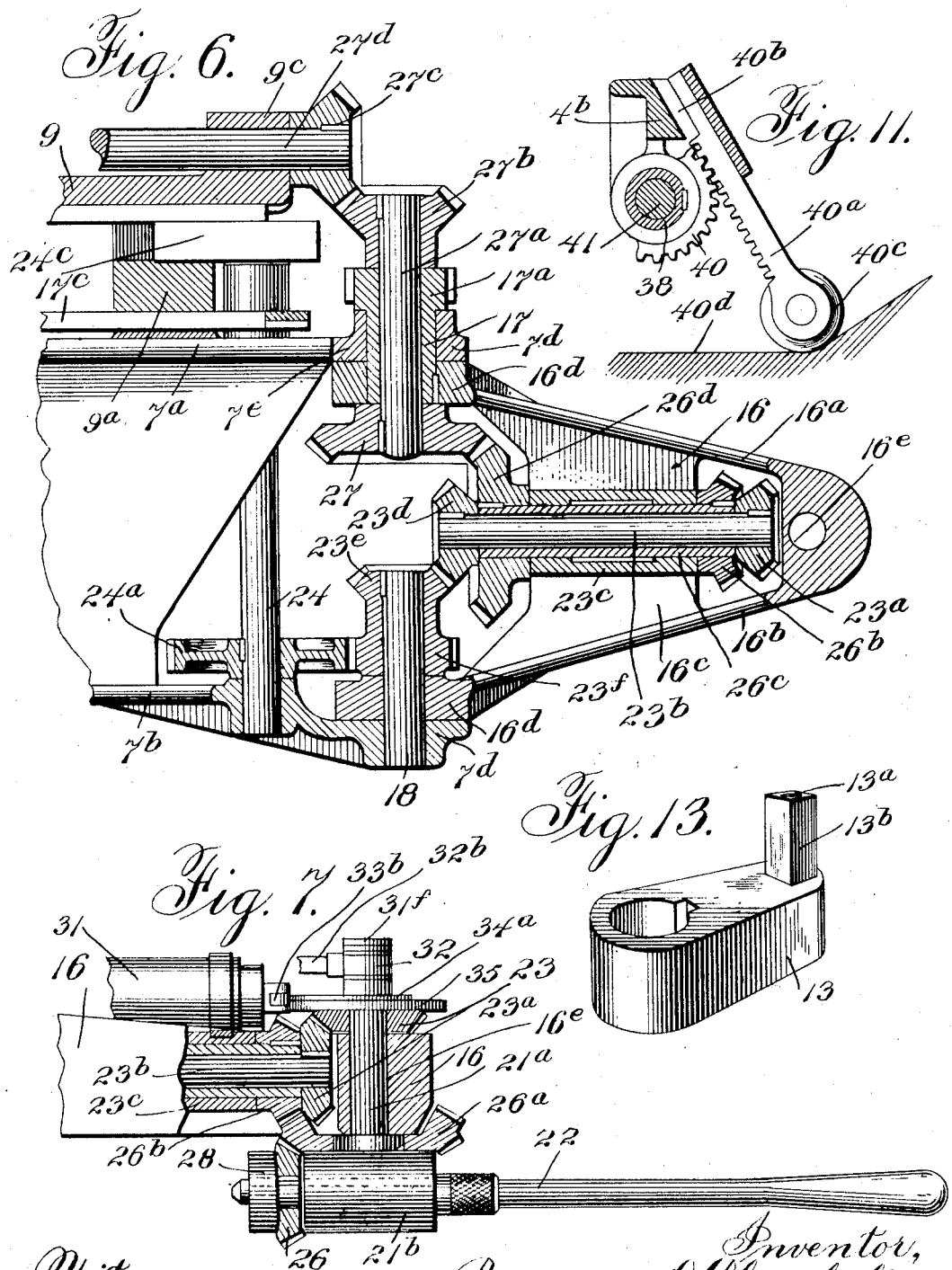

Sept. 1, 1925. 1,551,933
B. D. CHAMBERLIN
MACHINE FOR THE PRODUCTION OF GLASS ARTICLES
Filed March 23, 1910 21 Sheets-Sheet 7
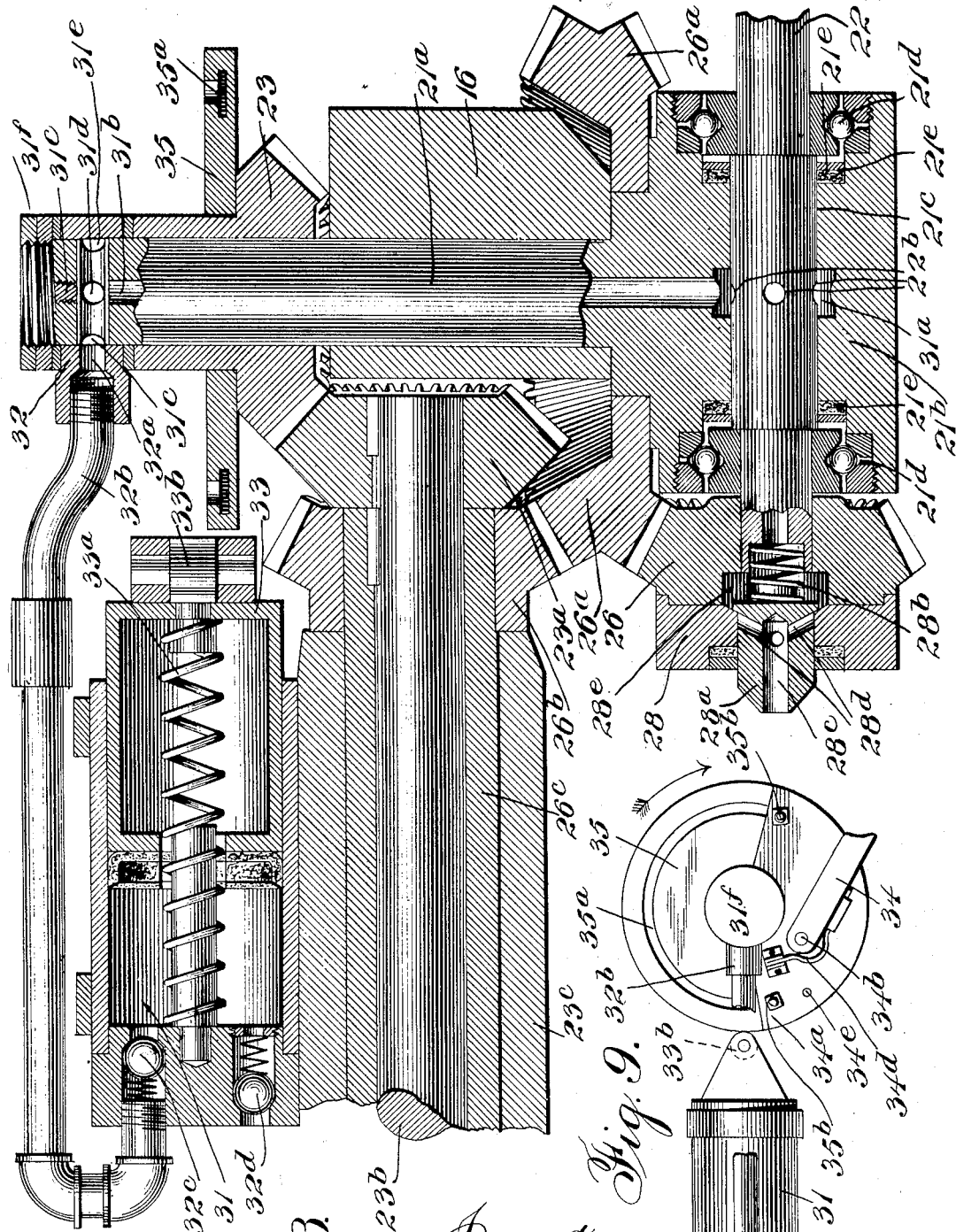
Witnesses:
Albert L. Krey
Paul L. Webb
Inventor,
Benjamin D. Chamberlin.
by Vernon H. Dorsey
his Attorney.

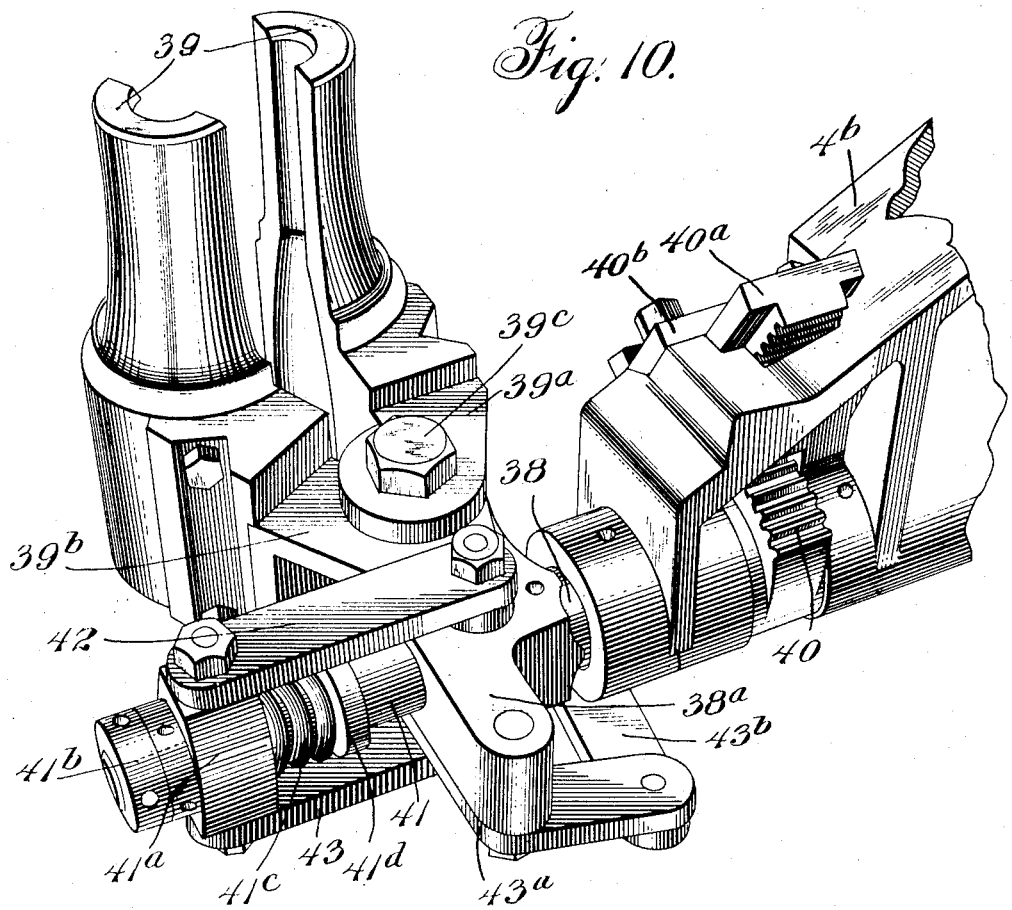

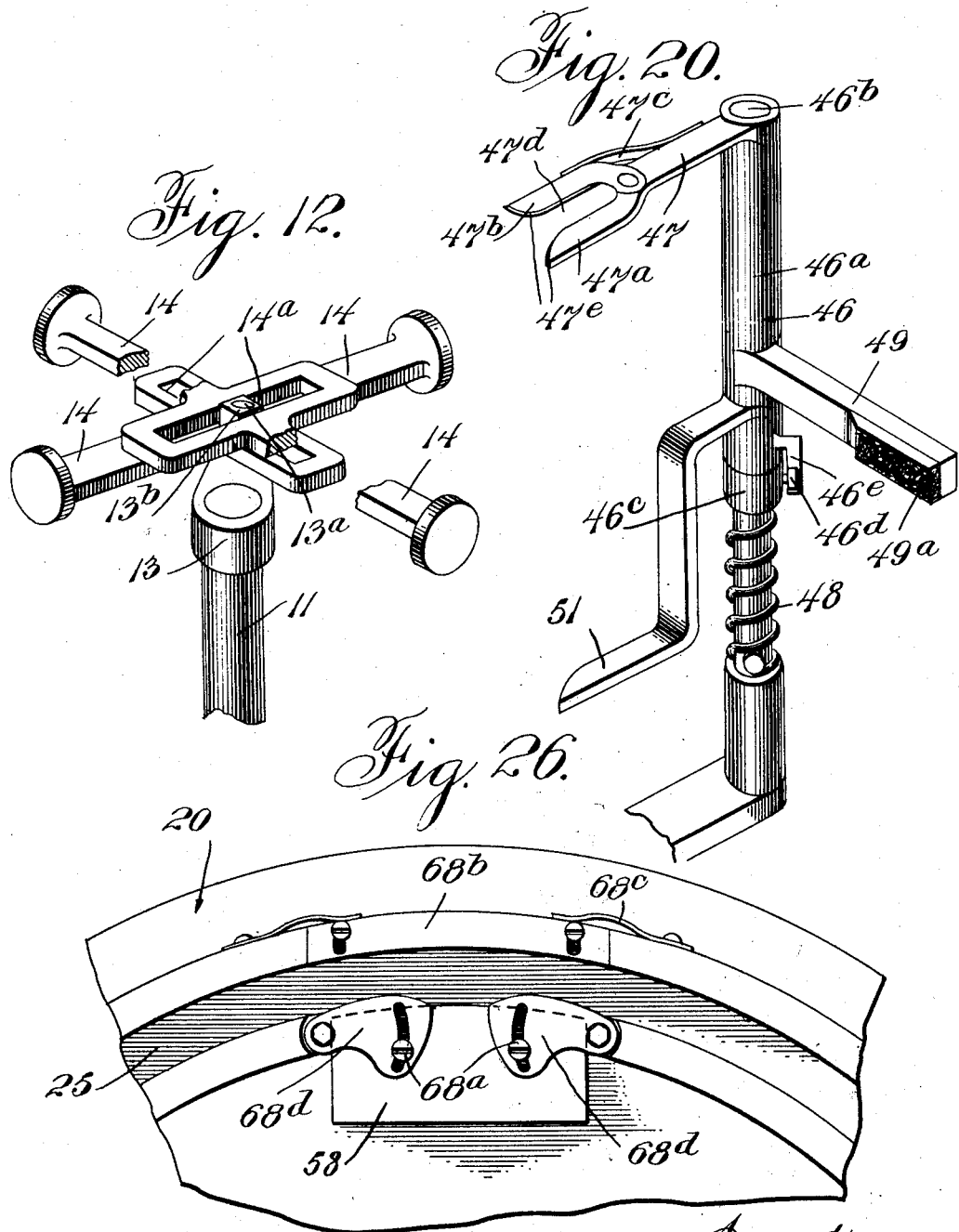

Sept. 1, 1925. 1,551,933
B. D. CHAMBERLIN
MACHINE FOR THE PRODUCTION OF GLASS ARTICLES
Filed March 23, 1910 21 Sheets-Sheet 10
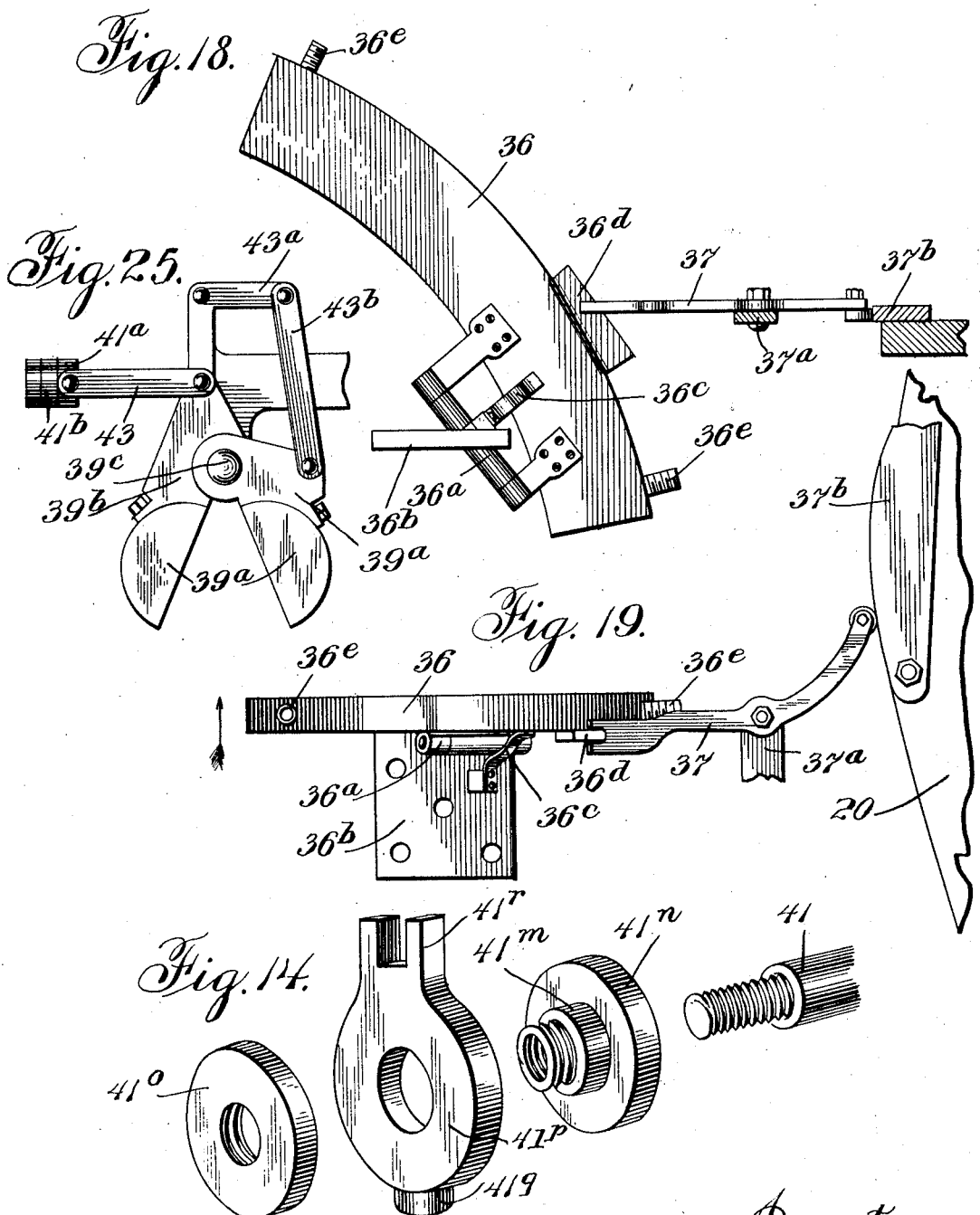

Sept. 1, 1925. 1,551,933
B. D. CHAMBERLIN
MACHINE FOR THE PRODUCTION OF GLASS ARTICLES
Filed March 23, 1910 21 Sheets-Sheet 11
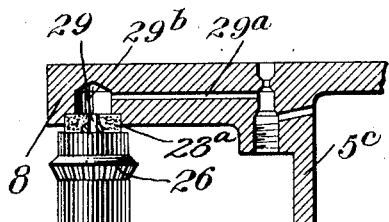
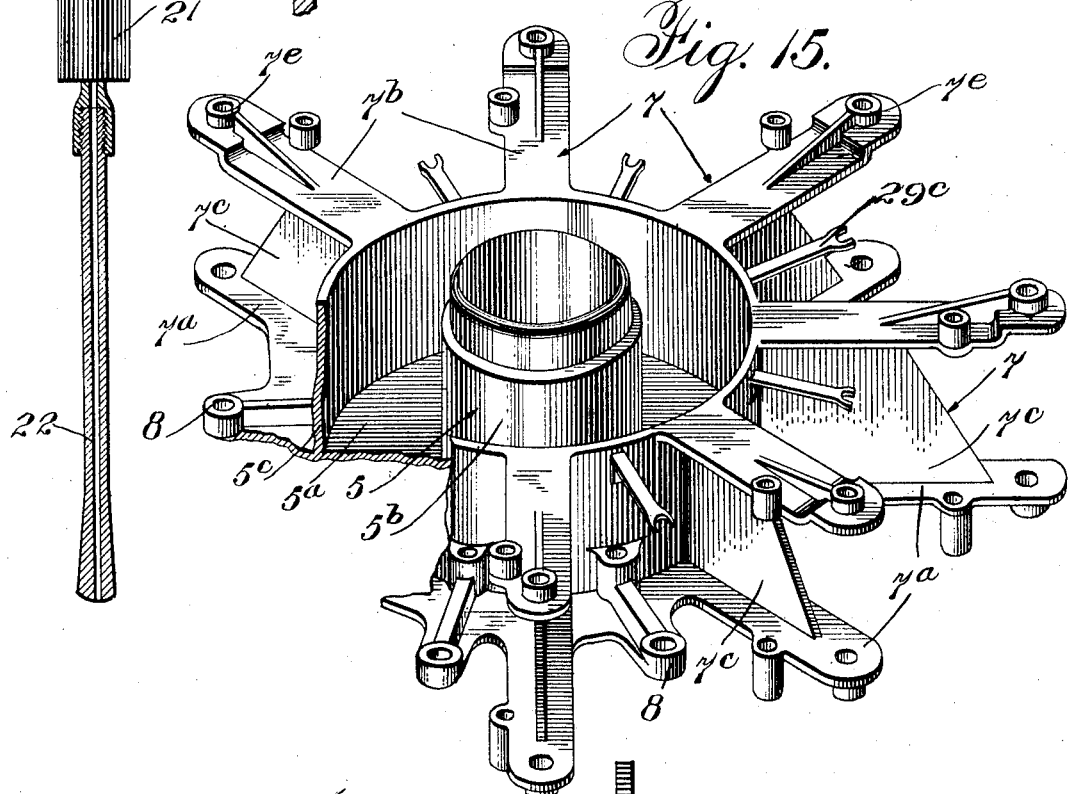
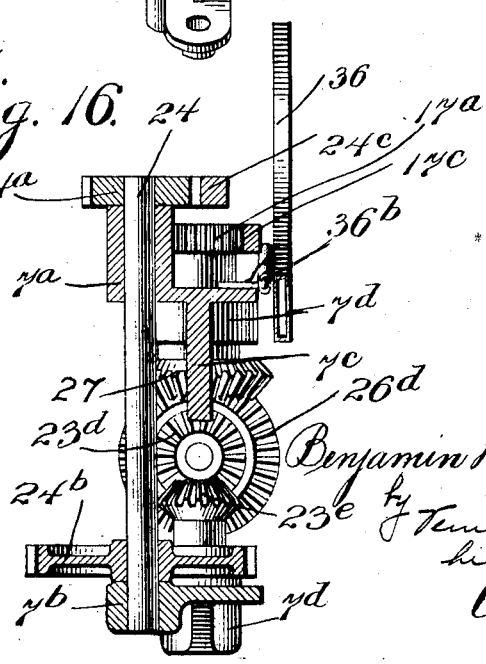

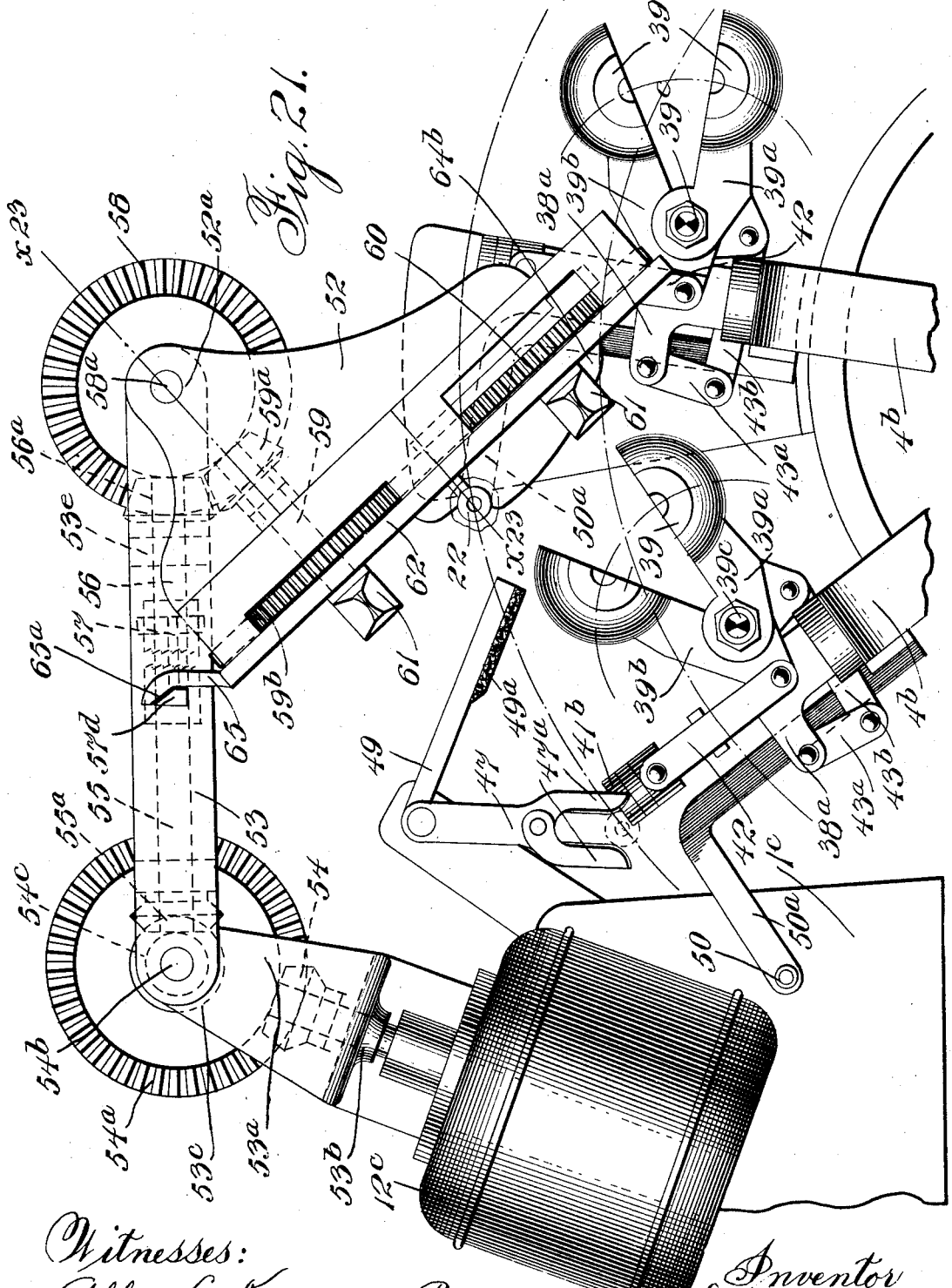

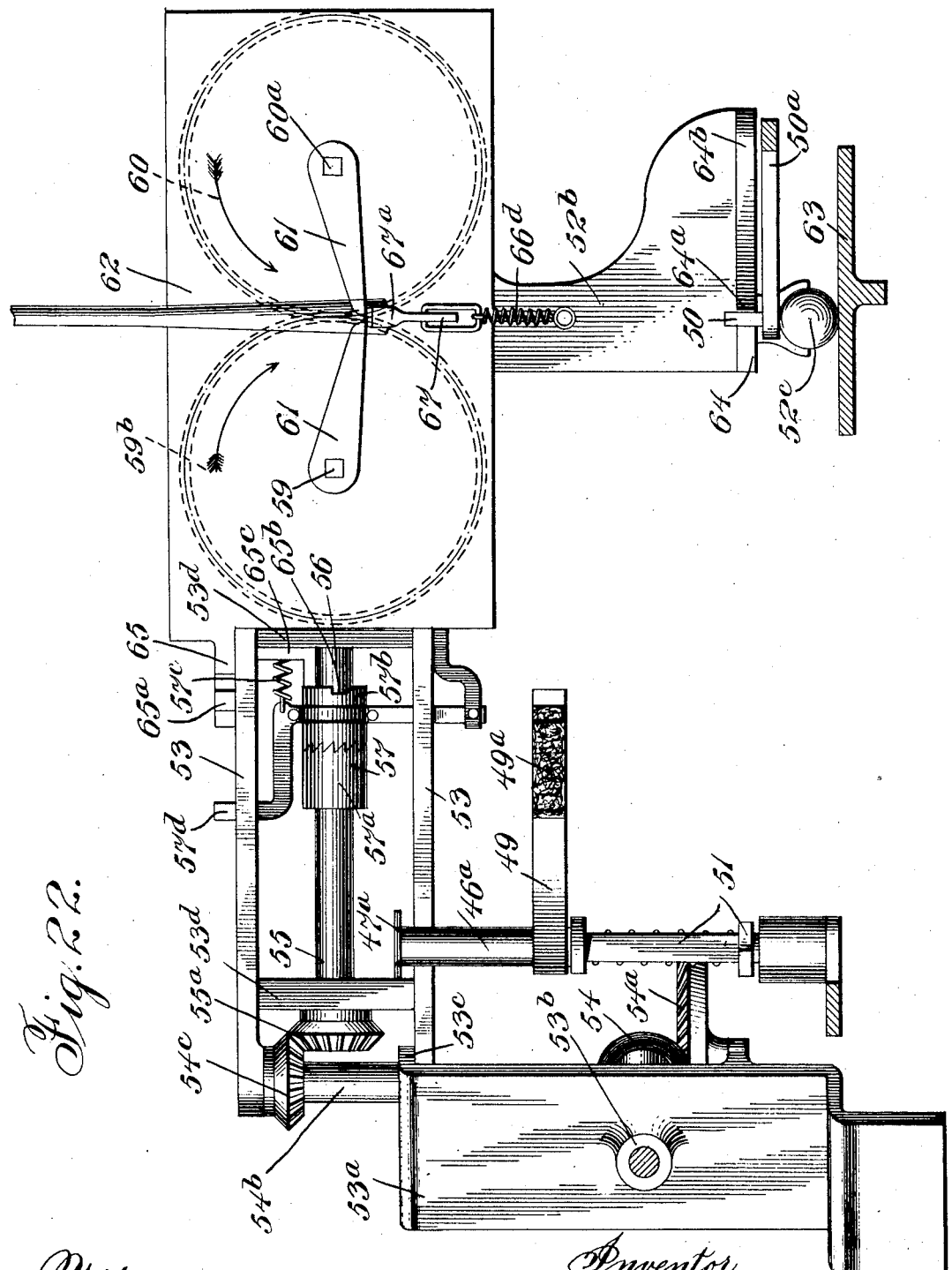

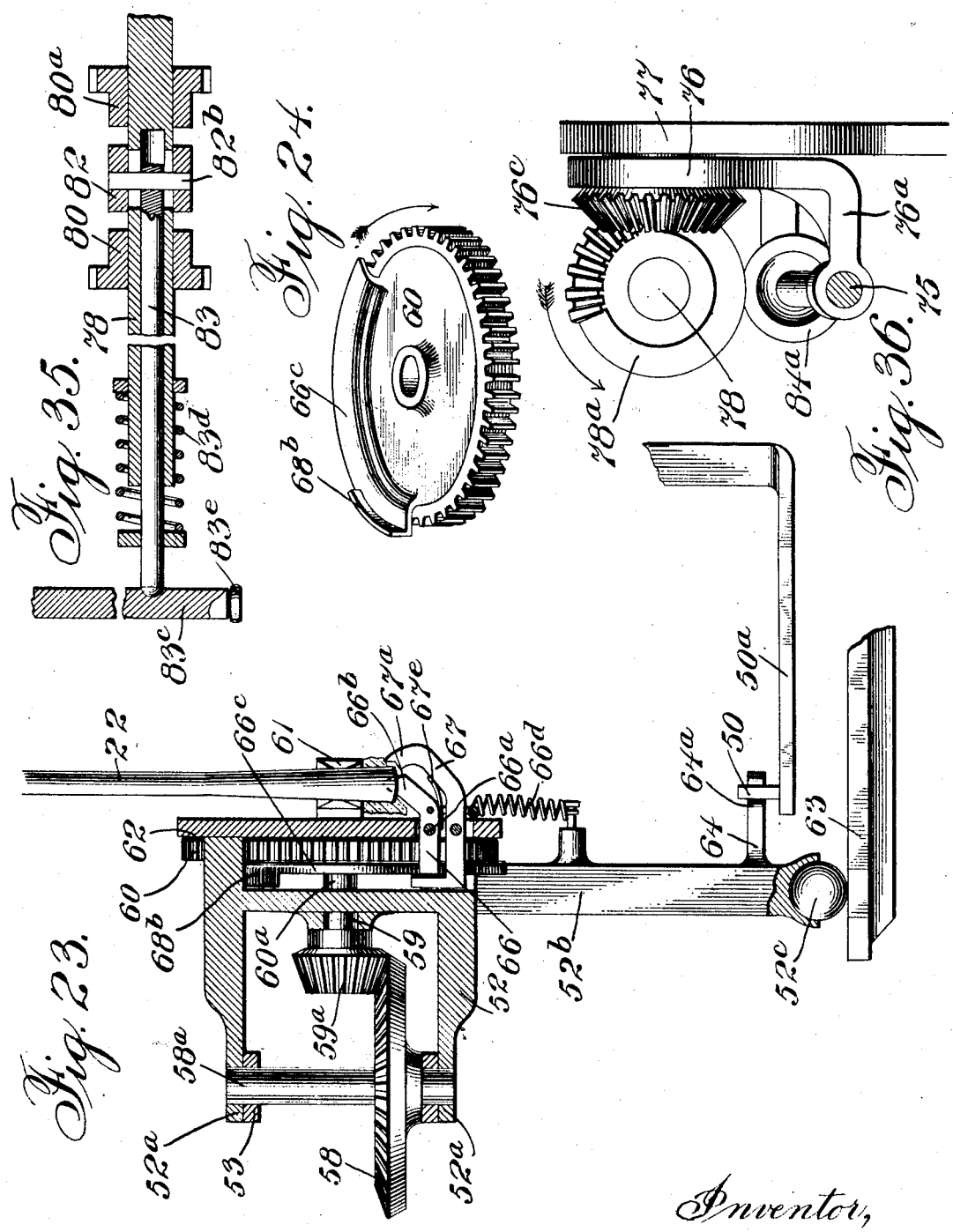

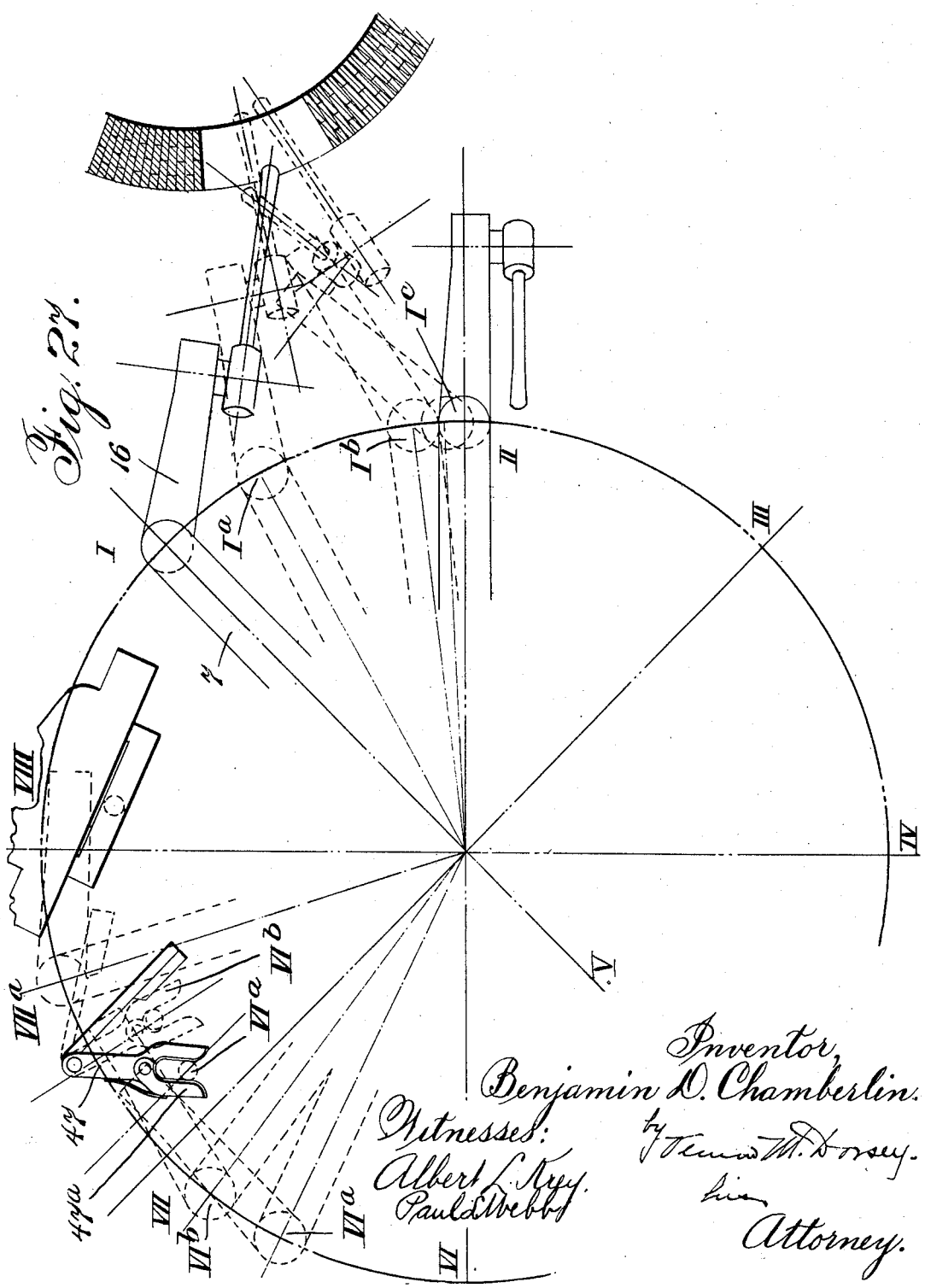

Sept. 1, 1925.

B. D. CHAMBERLIN

MACHINE FOR THE PRODUCTION OF GLASS ARTICLES

Filed March 23, 1910 21 Sheets-Sheet 16

1,551,933

Witnesses:
Albert L. Krey
Paul L. Webb

Inventor,
Benjamin D. Chamberlin
by Vernon W. Dorsey
his Attorney.

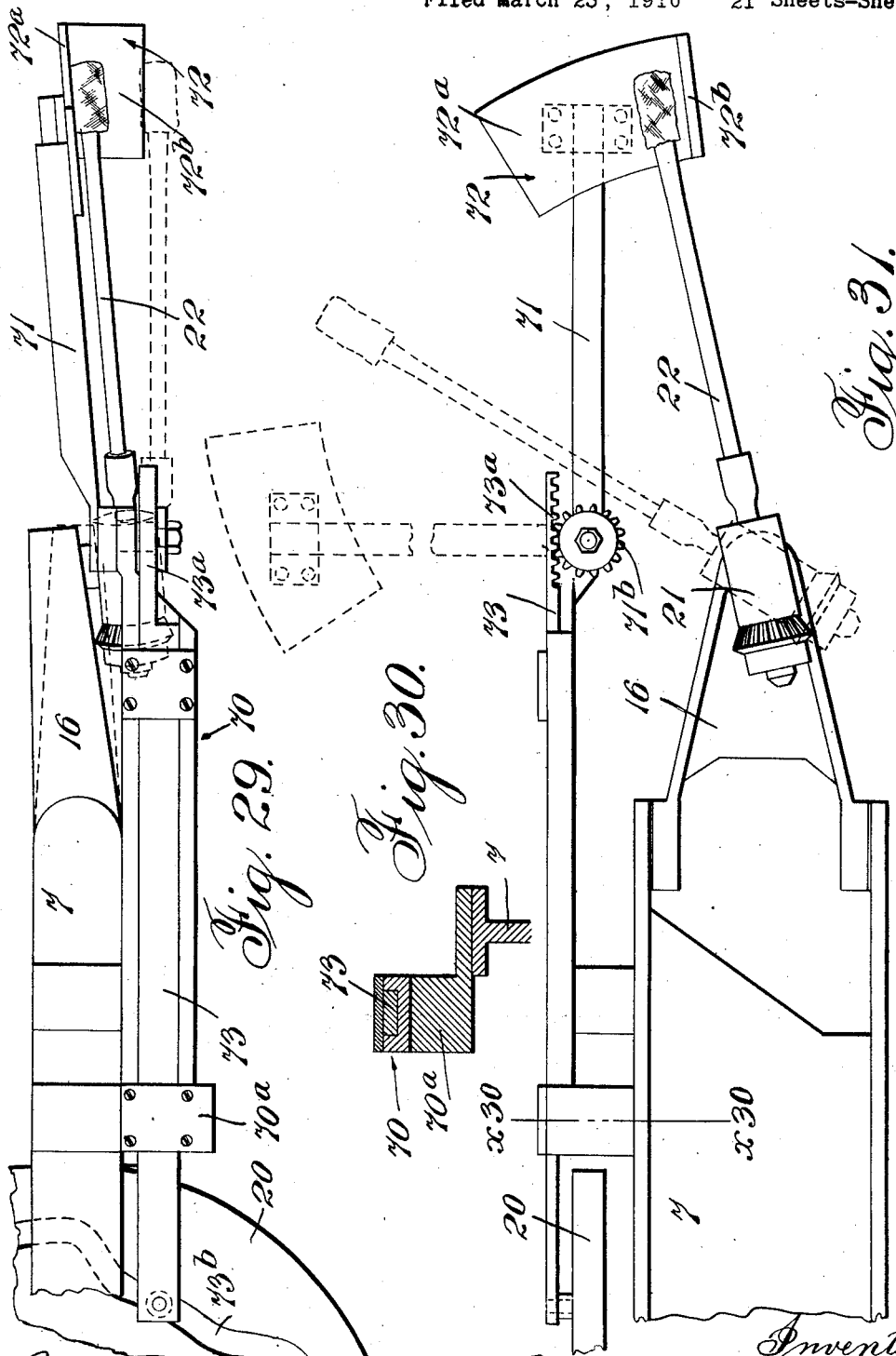

Sept. 1, 1925. 1,551,933
B. D. CHAMBERLIN
MACHINE FOR THE PRODUCTION OF GLASS ARTICLES
Filed March 23, 1910 21 Sheets-Sheet 18
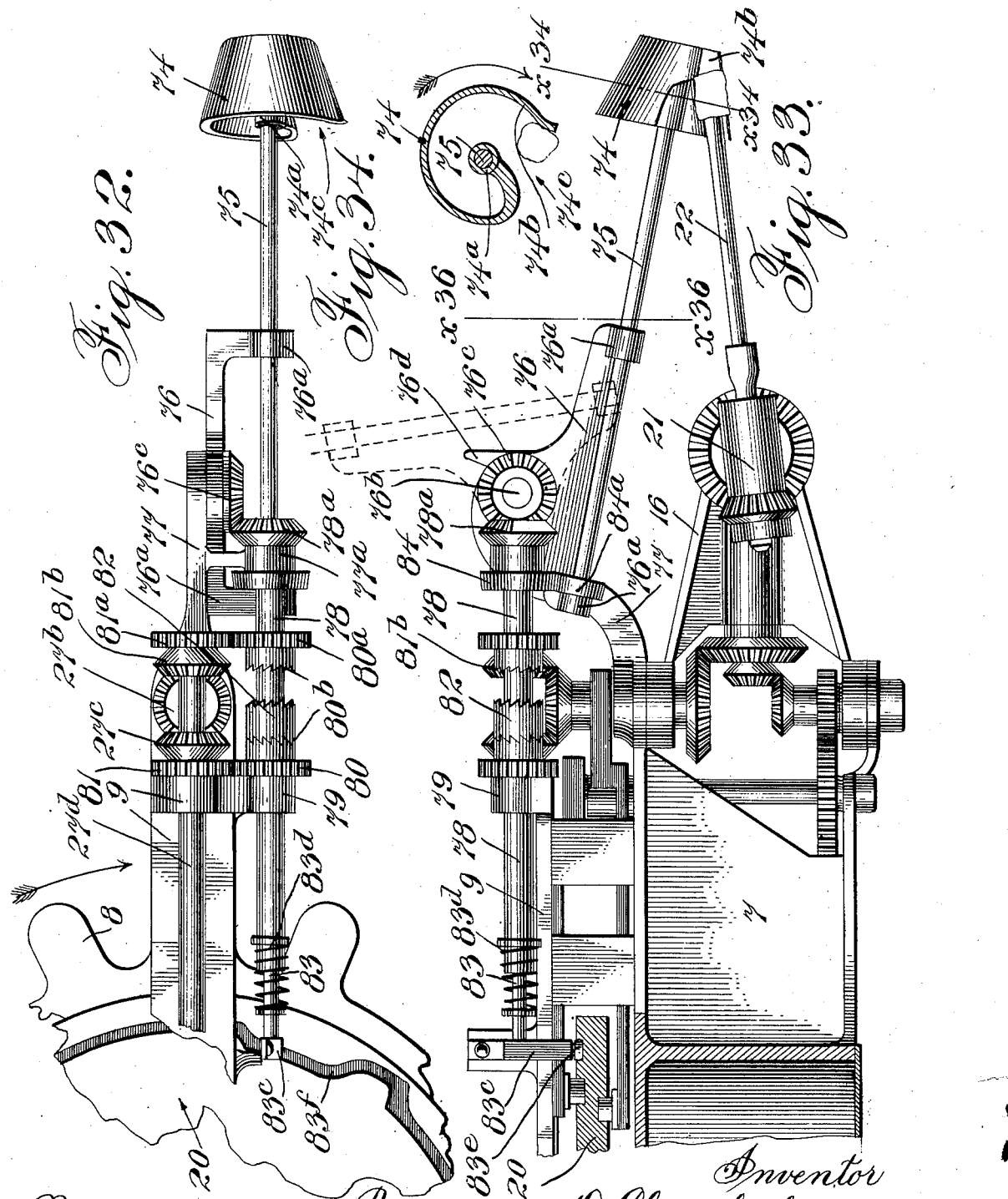
Witnesses:
Albert L. Krey
Paul L. Webbs
Inventor
Benjamin D. Chamberlin
by Vernon W. Dorsey
his Attorney.

Sept. 1, 1925. 1,551,933
B. D. CHAMBERLIN
MACHINE FOR THE PRODUCTION OF GLASS ARTICLES
Filed March 23, 1910 21 Sheets-Sheet 19
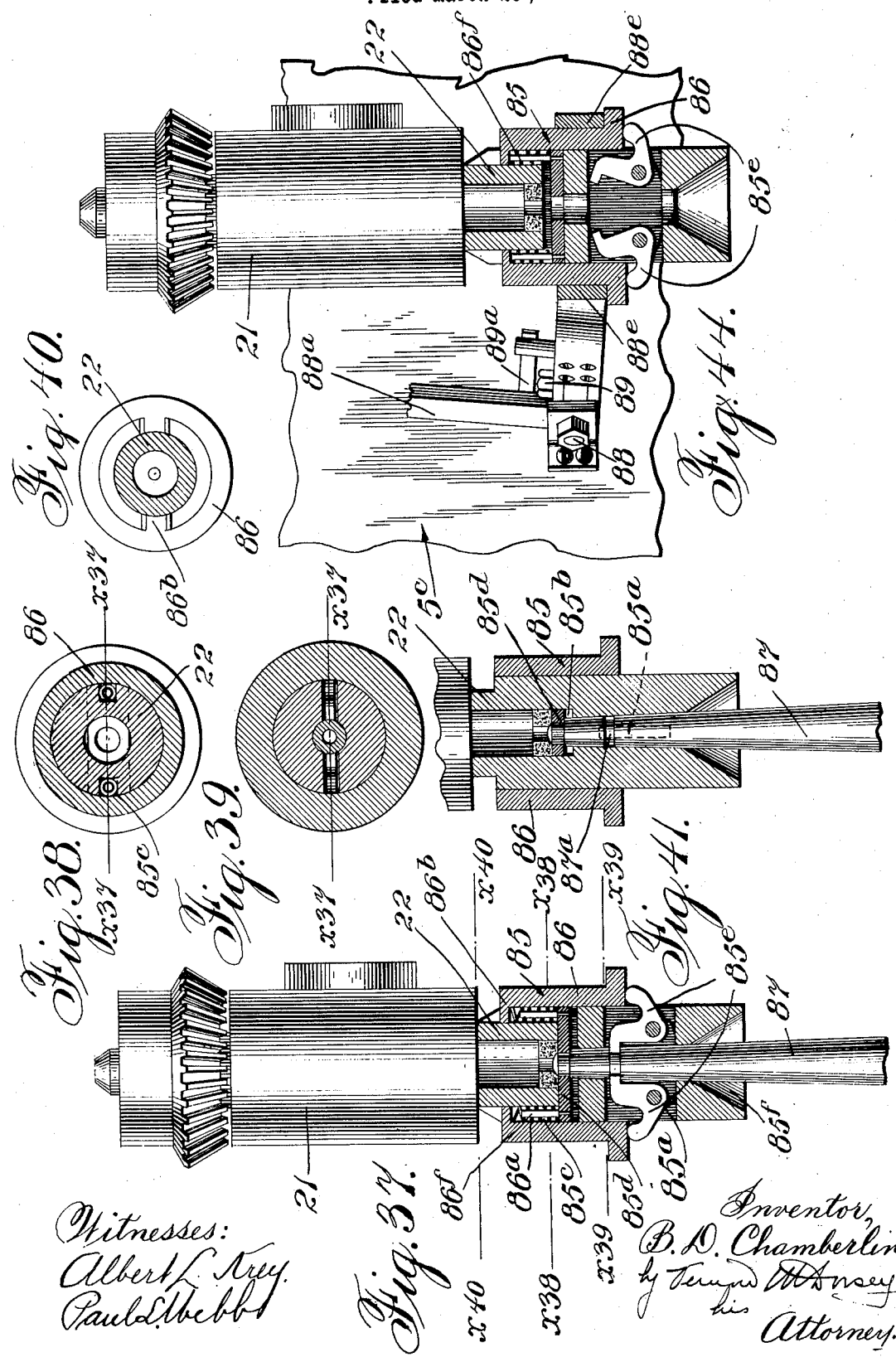

Sept. 1, 1925. 1,551,933
B. D. CHAMBERLIN
MACHINE FOR THE PRODUCTION OF GLASS ARTICLES
Filed March 23, 1910 21 Sheets-Sheet 20
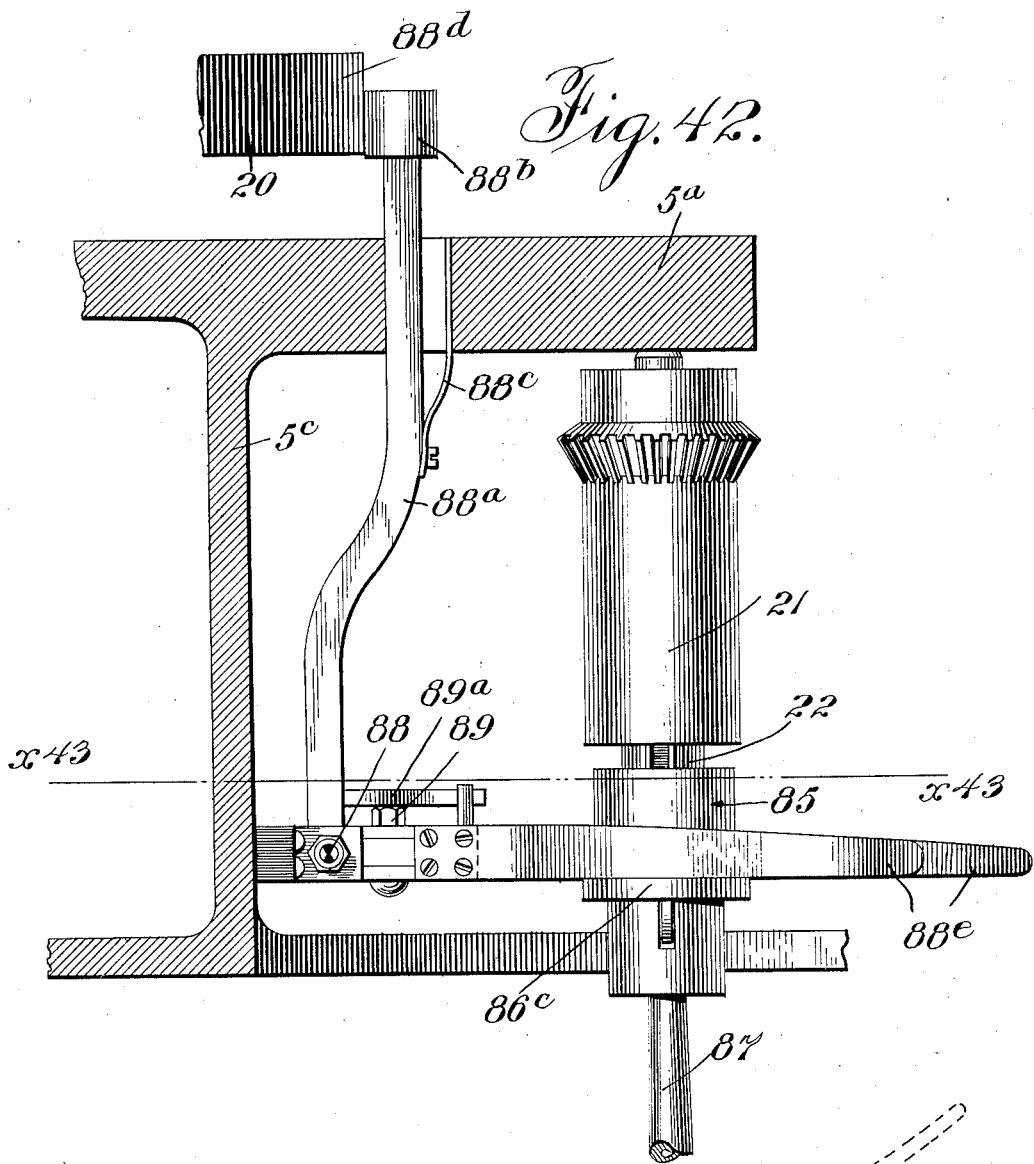
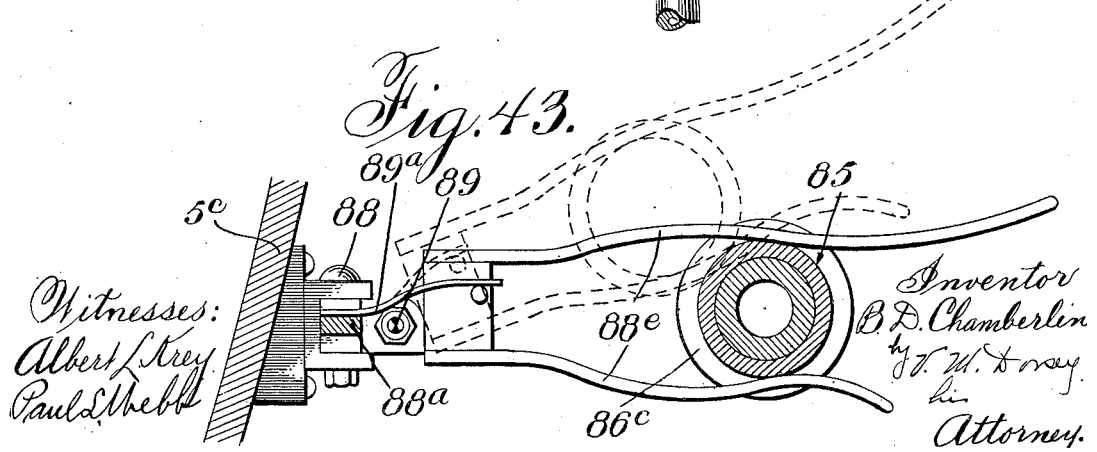

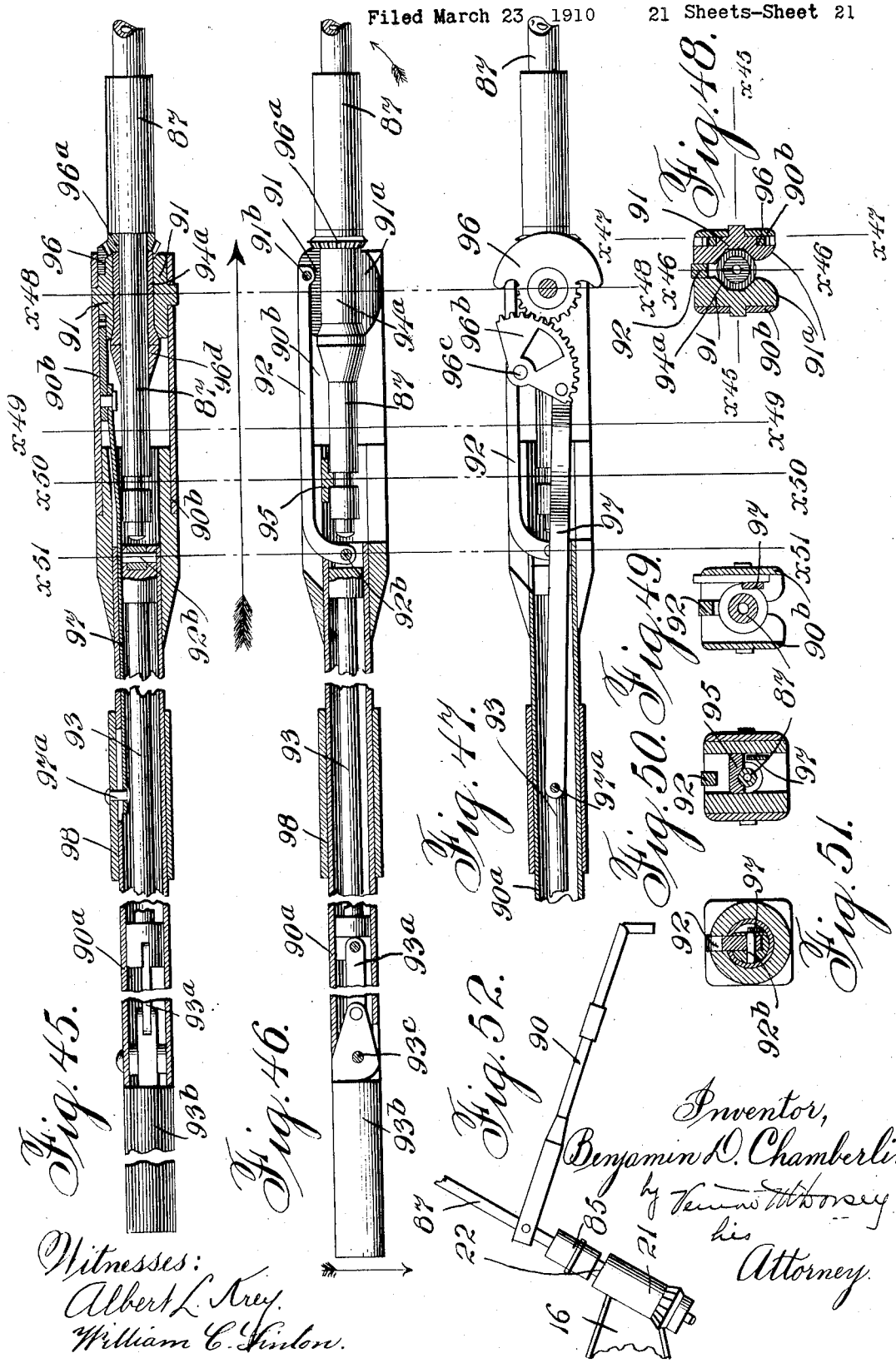

Patented Sept. 1, 1925.

1,551,933

UNITED STATES PATENT OFFICE.

BENJAMIN D. CHAMBERLIN, OF WASHINGTON, DISTRICT OF COLUMBIA, ASSIGNOR, BY MESNE ASSIGNMENTS, TO HARTFORD-EMPIRE COMPANY, OF HARTFORD, CONNECTICUT, A CORPORATION OF DELAWARE.

MACHINE FOR THE PRODUCTION OF GLASS ARTICLES.

Application filed March 23, 1910. Serial No. 551,198.

*To all whom it may concern:*

Be it known that I, BENJAMIN D. CHAMBERLIN, a citizen of the United States of America, and a resident of Washington, District of Columbia, have invented certain new and useful Improvements in Machines for the Production of Glass Articles, of which the following is a specification.

My invention has for its object to provide a machine of the general class above named which is adapted not only to perform those operations which have heretofore been commonly performed in the so called glass blowing machine but which is further adapted to perform certain operations which are preliminary to blowing (including the gathering of the glass upon the pontee or blowpipe, the marvering, or the elongation of the gather by swinging, or any or all of these steps) and if desired it is also adapted to remove the finished article and to clean the moil from the pontee or blow-pipe preliminary to a new gather.

In the preferred type of machine herein shown the pontee or blow-pipe is not in its operation removed from the machine and no means are shown in connection with such machine for rendering such blow-pipe removable, as such is unnecessary for the reason that the gathering, and the cleaning of the blow-pipes are, as well as the blowing, effected by the machine in its cycle of operations. It is obvious, however, that my invention in so far as its several individual features are concerned is not restricted to a machine embodying or capable of performing all of the operations above named, as the blowing mechanism is a fully operative one independent of how the gather is made and how the blow-pipe is cleaned. If it should be desired to gather, marver or swing by hand obviously hand gathering can be resorted to by the elimination of those parts whose operation have only to do with the gathering, marvering or swinging and by the use of suitable means by which the blowpipe could be rendered removable, and I have accordingly shown as a modification a type of machine in which removable blowpipes are employed and the gather is made by hand.

Generally speaking the preferred type of machine forming the subject matter of this application comprises a series of mold and mold actuating devices, and a series of blowpipes and blow-pipe actuating devices, the two sets moving in unison, there being a blow-pipe and its actuating device corresponding to each mold and its actuating device. With the series of molds and their actuating devices coacts a single cooling means and with the blow-pipes and their actuating devices coacts a single crack off device adapted to automatically remove the finished bulb from the blow-pipes and a single cleaning device adapted to remove the moil from the end of the blow-pipes and prepare them for subsequent gathering. For the purpose of bringing these molds and blow-pipe devices into co-operative relation with the cooling, crack off and cleaning devices the mold mechanism and the blow-pipe mechanism are caused to travel past and in respect to their respective coacting mechanisms, the corresponding molds and blow-pipes maintaining a fixed relation to each other at certain periods to permit blowing.

The actuating devices comprise means for supporting and manipulating a blow-pipe in such manner that the end thereof may be projected into the mouth of the furnace and into molten glass contained therein and held substantially stationary during the continuous travel of the main elements of the machine during the limited time sufficient to make a good gather; whereby such blowpipe and the gather thereon may then be withdrawn from the furnace and the gather marvered and subsequently swung and then the blow-pipe presented vertically above and in operative relation with its co-operating mold; whereby such mold after having been properly cooled may be closed upon the gather upon the blow-pipe and after the blowing operation may be removed from the finished article; whereby the finished article may be cut or removed from the pontee or blow-pipe and the residual glass broken therefrom and whereby the air may be supplied to the blow-pipe to afford a proper preliminary puff and to accomplish blowing in the mold, all these operations being performed automatically and while the blowpipes and molds are in motion around their common center. To secure a proper and desirable action of the machine having the general features of my invention as above described, I have devised numerous subsidiary features and my invention therefore further consists in the combination, construction and arrangement of the several parts of which it is composed as will be hereinafter more fully described, and be claimed after I shall have described the best construction known to me by which the objects above set forth may be obtained, although it is obvious that the several features of my invention may be embodied in different types of mechanisms.

For clearness I shall specifically describe my invention solely with reference to the accompanying drawings, without reference to modifications thereof, other than those shown, and which while embodying its principles of operation employ equivalent structures, as such changes will be obvious to those skilled in the art and it is not to be understood that by such specific description of the means employed to produce the results specified, I restrict myself to the described instrumentalities. When I consider invention to reside in the means employed I shall make specific claims thereto.

Referring to the accompanying drawings in which corresponding parts are designated by corresponding marks of reference:—

Fig. 6 is a detailed enlarged sectional view of one of the blow-pipe carrying arms and supports, together with the actuating mechanisms therefor.

Fig. 7 is a plan view, partly in section, showing the manner in which the blow-pipe support is mounted and the mechanism for giving the initial puff.

Fig. 8 is an enlarged sectional view of the mechanisms shown in Fig. 7.

Fig. 9 is a detail elevation (on a scale smaller than Fig. 8) of the puff producing mechanism shown in the Figs. 7 and 8.

Fig. 10 is an enlarged perspective view of the mold closing and lifting mechanisms.

Fig. 11 is a detail sectional view of the mold lifting mechanism.

Fig. 12 is a detail in perspective of the air pumps and actuating links, the parts being slightly separated for the purpose of illustration.

Fig. 13 is a detail in perspective of the pump actuating crank.

Fig. 14 is a detailed perspective, the parts being separated for the purpose of illustration, of the mold closing actuator.

Fig. 15 is an inverted perspective view of the rotating head casting.

Fig. 16 is a vertical section through one of the blow-pipe arms on line $x^{16}$—$x^{16}$ of Fig. 2.

Fig. 17 is a detail in vertical section showing an air port with a blow-pipe held in registration therewith.

Fig. 18 is a detail, in elevation, of the marverer and its mounting.

Fig. 19 is a plan view thereof.

Fig. 20 is a perspective view illustrating the character of mechanism employed for removing the finished article from the blow-pipe.

Fig. 21 is an enlarged plan view of certain parts of the base of the machine showing also the cleaner for removing the moil from the blow-pipe in its normal position.

Fig. 22 is a side elevation thereof partly in section but showing the cleaner moved from the normal position.

Fig. 23 is a vertical section on lines $x^{23}$—$x^{23}$ of Fig. 21.

Fig. 24 is a perspective view of the cam gear in the cleaner.

Fig. 25 is an inverted plan of the mold and part of its actuating mechanism.

Fig. 26 is a plan view illustrating a detail of construction of the blow-pipe lifting cam run.

Fig. 27 is a diagrammatic view in which certain positions which the blow-pipes assume in their cycle of operation are shown as projected in a horizontal plane.

Fig. 29 is a plan view showing a form of marverer and its mounting which may be used in lieu of the marverer shown in the previous figures.

Fig. 30 is a detailed cross section on lines $x^{30}$—$x^{30}$ of Fig. 31.

Fig. 31 is a side elevation of the marverer shown in Fig. 29 representing in full lines the marvering position and in dotted lines the raised position of the marverer.

Fig. 32 is a plan view of another form of marverer movable into and out of the marvering position.

Fig. 33 is a side elevation thereof representing in full lines the marvering position.

Fig. 34 is a section on lines $x^{34}$—$x^{34}$ of the marverer shown in Fig. 33.

Fig. 35 is a detailed sectional view illustrating the clutch mechanism for the marverer shown in Figs. 32 and 33.

Fig. 36 is a vertical section on line $x^{36}$—$x^{36}$ of Fig. 33.

Fig. 37 is a side elevation of the blow-pipe support adapted to be used in connection with a removable blow-pipe, the blow-pipe chuck forming a part of the support being shown in section, the line of section being on $x^{37}$—$x^{37}$ of Figs. 38 and 39.

Fig. 38 is a horizontal section on lines $x^{38}$—$x^{38}$ of Fig. 37.

Fig. 39 is a horizontal section on lines $x^{39}$—$x^{39}$ of Fig. 37.

Fig. 40 is a section on lines $x^{40}$—$x^{40}$ of Fig. 37.

Fig. 41 is a fragmental section taken at right angles to the line of section of Fig. 37.

Fig. 42 illustrates a side elevation of a blow-pipe releasing mechanism adapted to co-act with the chuck shown in Figs. 37 to 41.

Fig. 43 is a horizontal section on lines $x^{43}$—$x^{43}$ of Fig. 42.

Fig. 44 is a perspective view partly in elevation of the blow-pipe releasing mechanism shown in Fig. 42 showing it in the position it assumes when opening the chuck.

Figure 1:
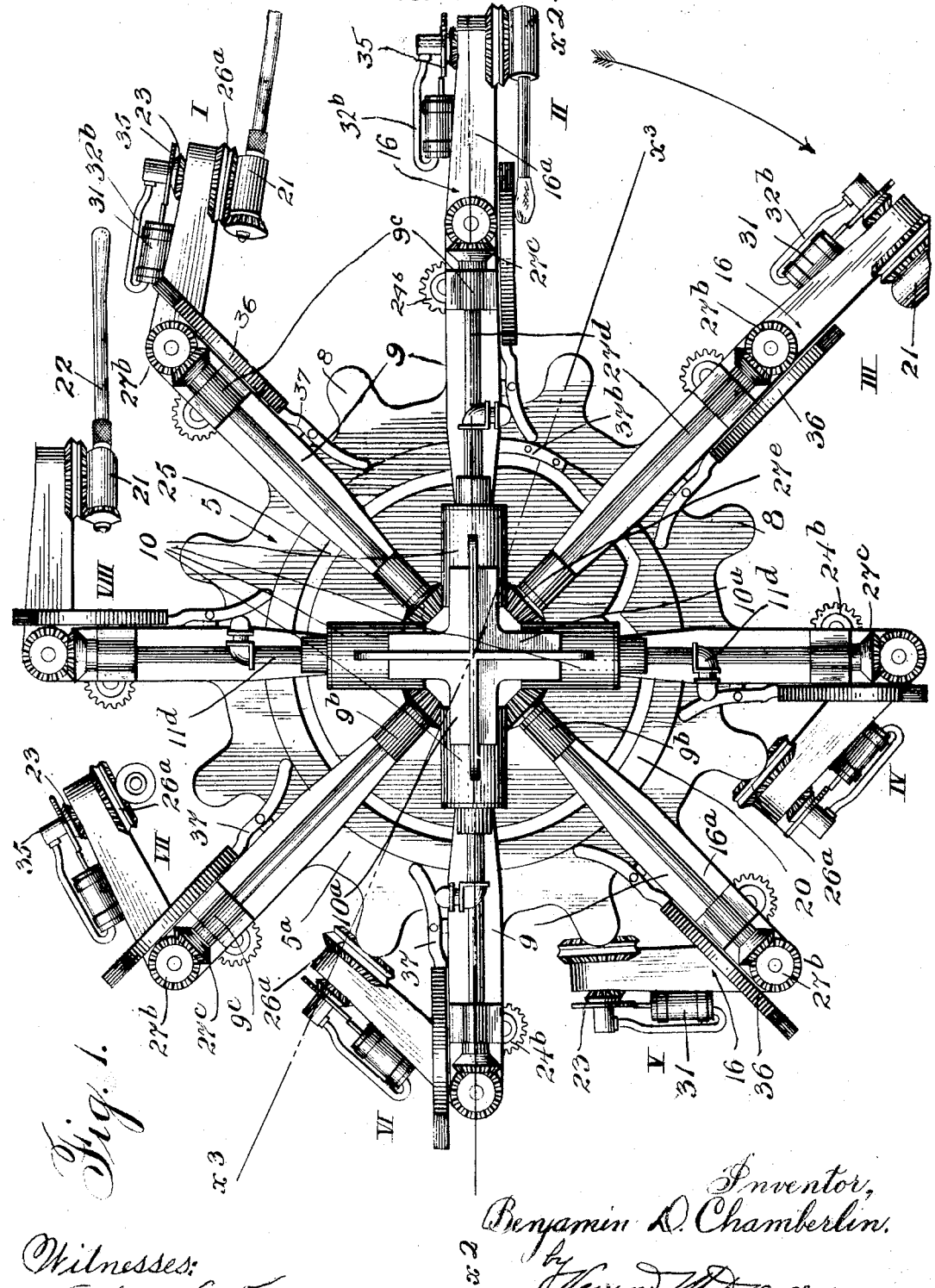
Fig. 1 is a plan view of a machine constructed in accordance with the preferred form of this invention and embodying mechanism for gathering. In this view for purposes of clearness only the parts connected with the travelling head are shown.
Figure 2:
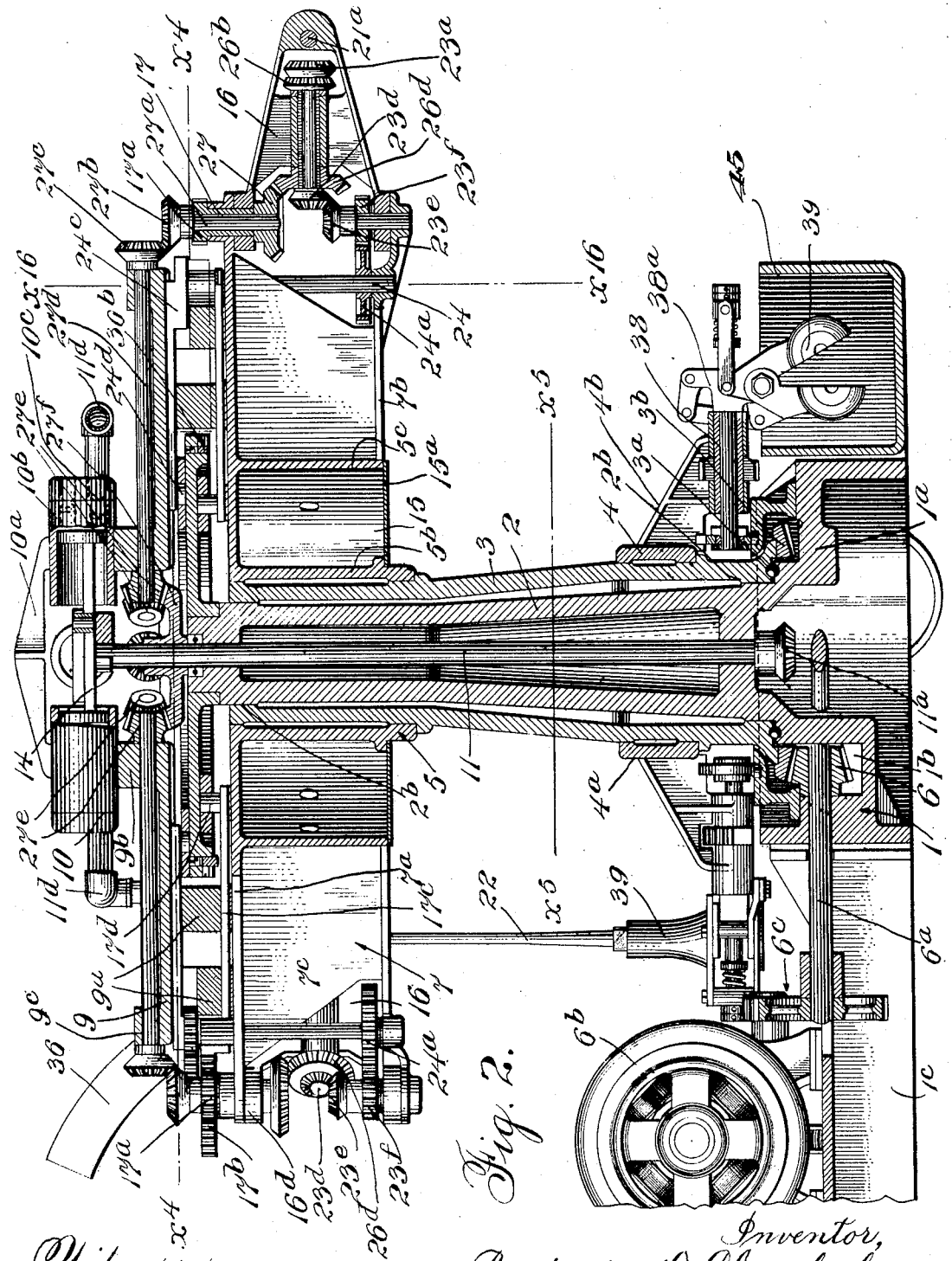
Fig. 2 is a vertical transverse section thereof on line $x^2$—$x^2$ of Fig. 1.
Figure 3:
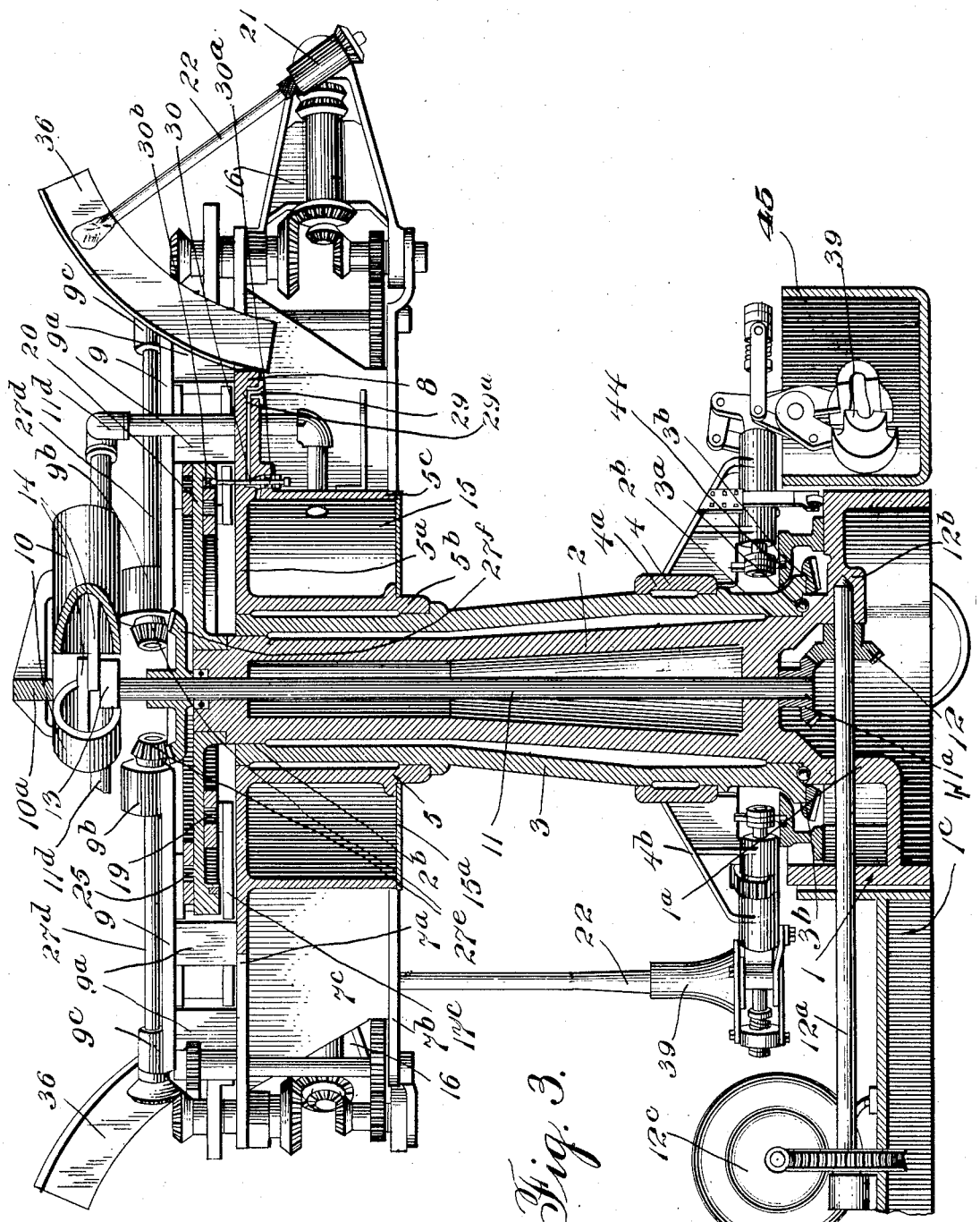
Fig. 3 is a corresponding section on line $x^3$—$x^3$ of Fig. 1.

Figs. 45, 46, and 47 are vertical sections partly in elevation of the detachable handle for a removable blow-pipe, the blow-pipe being shown within the handle, the lines of section being on $x^{45}$—$x^{45}$; $x^{46}$—$x^{46}$ and $x^{47}$—$x^{47}$ respectively of Fig. 48.

Figs. 48, 49, 50 and 51 are transverse sections taken on lines $x^{48}$—$x^{48}$; $x^{49}$—$x^{49}$; $x^{50}$—$x^{50}$ and $x^{51}$—$x^{51}$ respectively of Figs. 45 to 47, inclusive.

Fig. 52 is an illustration representing the manner in which a removable pipe may be inserted in the blow-pipe chuck shown in the preceding figures.

*General structure.*—I will first describe the machine embodying the preferred form of my invention, shown in Figs. 1 to 28, inclusive, and the operation thereof and will then describe certain modifications thereof and such additional features as are necessary to adapt that machine to hand gathering. While Figs. 29 to 36, inclusive, illustrate forms of marverers different from that shown in the previous figures they relate to and belong to the perfected form of my invention, in that they relate to features adapted for use in connection with automatic gathering.

The machine comprises a suitable base 1 (Figs. 2 and 3) having a vertical tubular standard 2 arising from the top thereof, these parts serving as guides and bearings for a sleeve 3, having rigidly attached to its lower end a mold supporting spider 4 and to its upper end a blow-pipe carrying head 5. Certain cam devices adapted to actuate the mold mechanisms carried by the spider are attached to the base 1 and certain other cam devices adapted to actuate the blow-pipe mechanisms and to control the blowing and the marverer are attached to the head of the standard as will be described. While the base 1 may and by preference is mounted on wheels, as shown, the term "stationary" is applicable thereto (in that in the operation of the machine it has no movement) in contradiction to the travelling spider 4 and head 5, which in operation revolve around the vertical axis formed by the standard 2.

The weight of sleeve 3 and of the parts carried thereon is supported on a thrust bearing consisting of balls $3^a$ contained in an annular groove in the bottom of the sleeve 3 and in a corresponding groove in the upper face of a shoulder $1^a$ surrounding the base of the standard 2, the sleeve being guided by machined faces $2^b$—$2^b$ on the standard near the top and bottom thereof, which co-operate with corresponding internal faces on the sleeve. The sleeve has attached to its lower end a bevelled annular gear $3^b$ surrounding the lower end of the standard and meshing with a bevelled pinion 6 (Fig. 2) contained in a pocket $1^b$ in the base 1 and mounted on a horizontal shaft $6^a$ driven through reducing gearing $6^c$ (see also Fig. 5) by a suitable motor $6^b$, supported on an extension $1^c$ of the frame 1, which is bolted thereto. In this manner the sleeve and parts thereon are caused to revolve around the standard as a centre with an angular velocity determined by the speed of the motor, which should be adjusted to cause the proper functioning of the machine as will be hereinafter described.

The spider 4 fast on the lower end of the sleeve 3 comprises a central hub $4^a$ and a series of radial arms $4^b$ (shown as eight in number) and the head consists (see Figs. 1, 2, 3, 4 and 15) of casting formed with a centrally apertured top plate $5^a$ having two concentric annular walls $5^b$ and $5^c$ projecting downwardly from its under surface, the inner wall $5^b$ coinciding with the inner edges of the plate and fitting snugly upon the upper end of the sleeve 3 to which it is keyed. The outer wall $5^c$ is near the outer edge of the plate but such edge is interrupted by a series of arms 7, equal in number to the arms $4^b$ on the spider, radially projecting from the plate $5^a$ at regular intervals therearound. These arms each comprise top and bottom flanges $7^a$ and $7^b$ connected by radial vertical webs $7^c$, the inner ends of which join the interior of the wall $5^c$, the top flange forming an extension of the top plate $5^a$. Between each of the arms 7, the top plate is further provided with a peripheral extension 8, which by preference is slightly thicker than the body of the plate.

A series of radial bars 9 (shown as eight in number, Fig. 1) are carried from and at a slight distance above the top plate $5^a$ and the arms 7 thereon by blocks 9ª, the bars having on their opposite ends the bearings 9ᵇ and 9ᶜ to receive radial shafts to be hereinafter described.

The head carries an air pumping mechanism, comprising (Figs. 1, 2 and 3) a plurality of cylinders 10 mounted upon the inner bearings 9ᵇ of certain of the radial bars, the cylinders being formed in the arms of a spider 10ª. Thus mounted the cylinders are arranged around the upper end of their piston actuating shaft 11 which extends through the tubular standard 2 from above the upper end thereof to the hollow base 1 where it is provided with a bevelled gear 11ª (Fig. 3) driven by a pinion 12 on a horizontal shaft 12ª which has its inner end in a bearing 12ᵇ in the base 1, and its other end projecting outside the base and over the extension 1ᶜ thereof where it is driven by a motor 12ᶜ mounted on the latter. This provision of a separate motor for driving the air pump is made in order to ensure a greater flexibility of the machine, whereby variations of the blowing pressure and the angular velocity of the travelling parts may be made independently of each other.

The upper part of the shaft 11 (see Figs. 12 and 13) carries a crank arm 13 having an upwardly projecting wrist pin 13ª on the end thereof, the wrist pin receiving a rectangular (preferably square) sleeve 13ᵇ which is located in transverse slots 14ª in the piston rods 14. Two piston rods are employed, one located above the other, each serving for the actuation of the pistons of the diametrically opposite cylinders and each piston rod has located therein one of the transverse slots 14ª. As the piston rods are at right angles to each other, the transverse slots therein are also at right angles to each other and the rotation of the wrist pin around the axis of the shaft 11 will reciprocate the pistons in the cylinders, the square wrist pin sliding lengthwise of the slots.

The cylinders have opened inner ends and closed rear ends, the latter of which are provided with induction and eduction valves (shown dotted in Fig. 2) 10ᵇ and 10ᶜ respectively, the latter being interposed between the pump cylinders and their respective outflow pipes 11ᵈ, all of which are led downwardly (Figs. 2 and 3) through the top plate 5ª into the space between the annular walls 5ᵇ and 5ᶜ. This space is made into a reservoir 15 by an annulus 15ª bolted or otherwise fastened to the lower edges of the said walls.

In practice the number of arms 7 formed upon the head and the number of bearing bars 9 located thereabove will coincide with the number of blow-pipe units which are present in the machine, as each of the arms forms a support for one of such units. I have in the accompanying drawings shown a machine comprising eight blow-pipe units and as these units are identical in construction and operation it will be only necessary to describe one of them. Inasmuch as the parts of each unit move in relation to each other and their supporting arms during the progressive rotary movement of the arm upon which it is carried around the vertical tubular standard, I have in the drawing designated the several progressive positions shown therein as occupied by the arms, by the numerals I to VIII inclusive.

*Horizontal translating mechanism for the blow-pipes.*—The ends (see Figs. 2, 3 and 6) of the top and bottom flanges 7ª and 7ᵇ of each of the arms are extended outwardly beyond the web 7ᶜ thereof and are formed into ears 7ᵈ between which is mounted a blow-pipe carrier 16. Each carrier comprises a substantially triangular frame, formed by top and bottom flanges 16ª and 16ᵇ directly connected to each other intermediate of their length by the web 16ᶜ. The top and bottom flanges at their ends opposite the apex of the frame are flattened out and formed into ears 16ᵈ which are located between the ears 7ᵈ in the arms, the upper set of ears being articulated together by a sleeve 17, to which the upper ear 16ᵈ is keyed and which projects through a bearing 7ᵉ in the ear 7ᵈ, while the lower ears are articulated together by the pin 18. The sleeve 17 extends upwardly above the ear 7ᵈ and has fast on its upper end a gear 17ª, which meshes with a rack 17ᵇ (see positions I, II and III Fig. 4) carried upon the outer end of one of a series of bars 17ᶜ mounted for radial movement on the top plate 5ª and guided in the blocks 9ª, the inner end of the said bar having a stud roller 17ᵈ thereon, engaging a cam way 19 in the lower face of a plate 20 carried upon and held against movement by the top of the standard 2, and located above the top plate 5ª. It will be seen that the bar 17ᶜ will partake of the movement of the head around the standard and that it will in consequence thereof be given a radial movement dependent upon the shaping of the cam 19, and that in such radial movement it will through the pinion 17ª and sleeve 17 turn the frame 16 upon the vertical axis formed by such sleeve and by the pin 18. The general shape of such cam which is shown dotted in Fig. 4 and the results obtained therefrom will be hereinafter described.

Figure 4:
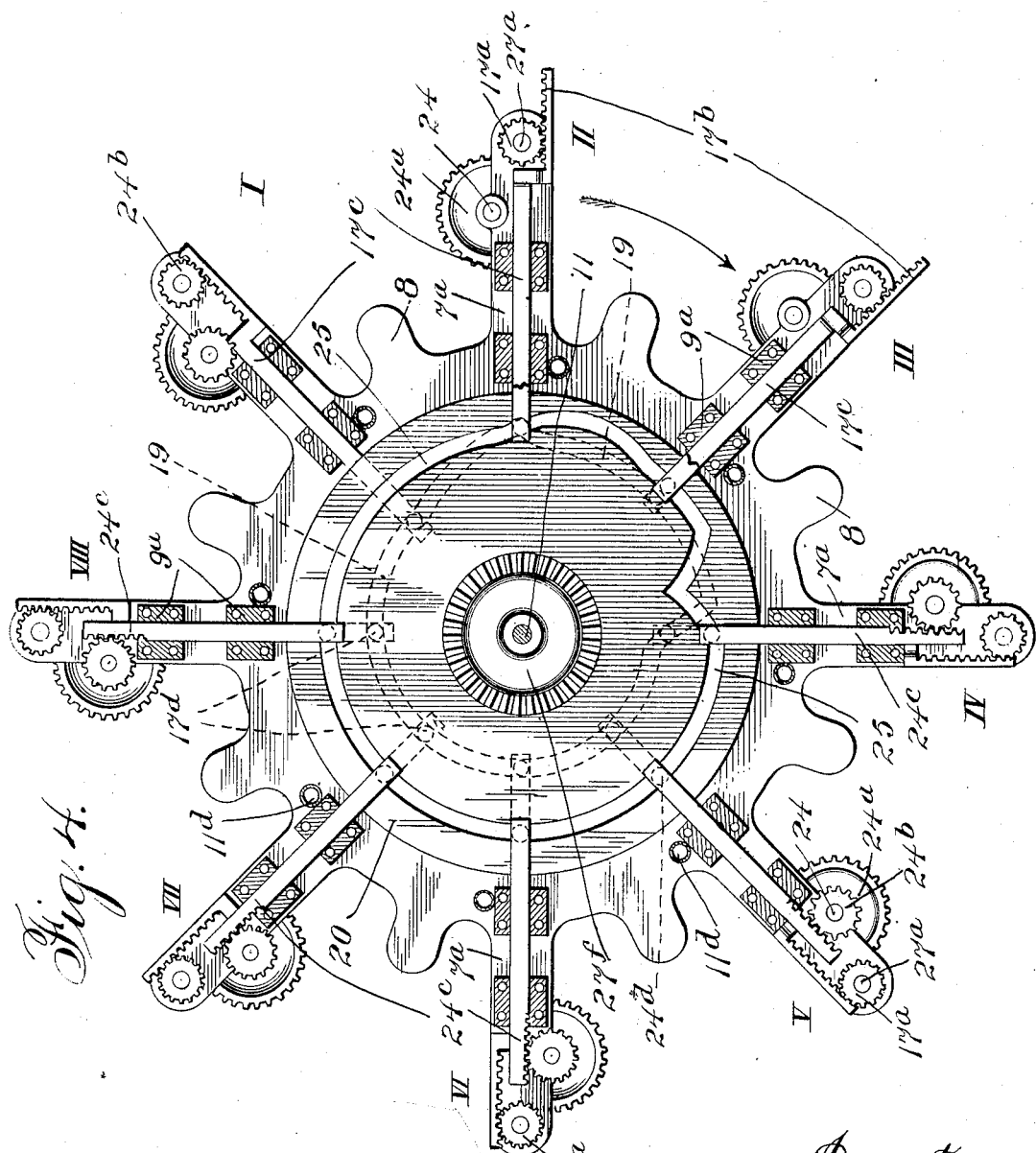
Fig. 4 is a horizontal section on line $x^4$—$x^4$ of Fig. 2.

*Vertical translating mechanism for the blow-pipes.*—The flanges 16ª, 16ᵇ of the blow-pipe carrying frame are thickened at their junction at the apex of the frame and have formed therein a transverse and horizontal bearing 16ᵉ through which projects the stem 21ª of the blow-pipe support 21, (shown in detail in Figs. 7, 8 and 9) the stem having upon its forward end the cross head 21^b, which holds the radially projecting blow-pipe 22, the latter projecting from the cross head at right angles to the stem, so that the blow-pipe by the rotation of the stem will be moved in a vertical plane. This rotation of the stem is provided for by keying a bevelled gear 23 thereon in the rear of the bearing 16^e and driving the same through a pinion 23^a fast on the outer end of a horizontal shaft 23^b contained in a bearing 23^c formed in the web 16^c of the carrying frame 16. The shaft 23^b has on its inner end (see Fig. 6) a bevelled pinion 23^d, which meshes with and is driven by a corresponding pinion 23^e mounted on the pin 18 and fast to the gear 23^f. A vertical shaft 24 is mounted in the arm 7 near the bearings 7^e and has fast on its lower end a pinion 24^a meshing with the gear 23^f and has on its upper end a gear 24^b with which meshes the outer end of one of a series of rack bars 24^c (see Fig. 4, positions IV, V, VI, VII and VIII) mounted for radial movement in the upper part of the blocks 9^a on the top plate, the inner end of said bar having a stud roller 24^d on the lower face thereof, taking into a cam way 25 on the upper face of the fixed plate 20. It will be seen that the bars 24^c overlie the bars 17^c which swing the carrying frame and that like the bars 17^c, the bars 24^c will partake of the movement of the head around the standard and that they will in consequence thereof be given a radial movement dependent upon the shape of the cam 25 and that in such radial movement each will drive through a pinion 24^b, vertical shaft 24, pinion 24^a, gears 23^f, 23^e and 23^d, horizontal shaft 23^b and gears 23^a and 23 to rotate the corresponding blow-pipe support around its axis as formed by its stem 21^a, swinging the blow-pipe carried in the cross-head thereof in a vertical plane. The shape of such cam, which is generally shown in full lines in Fig. 4 is such that, when the motion resulting therefrom is compounded with the relative motion of the gears 23^d and 23^e, due to any motion that may be given to the carrying frame upon its vertical pivots, it will accomplish the results and functions to be hereinafter described.

Mechanism has been described including the bars 17^c for moving the frames 16 on their vertical pivots whereby the blow-pipes as a whole are each given a horizontal motion of translation in respect to the head 5, and including the bars 24^c for revolving the blow-pipes about the horizontal axes formed by the stems 21^a and in a vertical plane.

*Rotation of blow-pipes around their longitudinal axes.*—Mechanism is also provided for revolving the blow-pipe around its longitudinal axis as is usual in hand gathering, marvering and blowing. For this purpose (see Figs. 6 and 8) the blow-pipe cross head 21^b is provided with a central bore 21^c longitudinal of the length of the cross head and transverse to the stem 21^a, through which bore the upper end of the blow-pipe projects, it being carried therein by ball bearings 21^d, the ends of the bore being provided with packing rings 21^e to prevent the escape of air around the pipe. The upper end of the pipe projects above the cross head and has keyed thereon a bevelled gear 26 which, through the interposition of a double bevelled geared ring 26^a sleeved on the stem 21^a between the bearing 16^e of the frame and the cross head, is driven by a bevelled pinion 26^b keyed to the outer end of a sleeve 26^c, surrounding the shaft 23^b and contained in the bearing 23^c of the blow-pipe supporting frame. The opposite or inner end of the sleeve has keyed thereto a bevelled gear 26^d meshing with a bevelled pinion 27 on the lower end of a vertical shaft 27^a contained in the sleeve 17 of the blow-pipe supporting frame, the upper end of such shaft having fast thereon above the upper end of the sleeve a bevelled gear 27^b driven by a bevelled pinion 27^c fast on the outer end of one of each of a series of shafts 27^d, one of which is carried in the bearings 9^b and 9^c of each of the radial bars 9, bevelled gears 27^e on the shafts 27^d meshing with the bevelled gear 27^f (see Figs. 2 and 3) fast to the vertical drive shaft 11 below the crank arm thereon, whereby the angular movement of such shaft in respect to the head 5 on which the horizontal shafts 27^d are carried will drive the latter and thus through the connections above described revolve the several blow-pipes around their longitudinal axes.

In order to permit the adjustment of the ends of a blow-pipe when the latter may become unfit for use by wear and tear, I preferably make the blow-pipe in two parts united by a screw joint as shown in Fig. 17.

*Air control* (Figs. 7, 8, 9 and 17).—The gear 26 mounted upon the end of the blow-pipe carries (see Fig. 8) a cap 28 having a central bore in which is contained a plunger 28^a pressed outwardly towards the top of the cap by a spring 28^b, the plunger having a rounded end and an axial central hole 28^c extending from such end inwardly and connecting with the periphery of the plunger near the rear end thereof by radial ports 28^d, the construction being such that when the plunger is projected by the spring the ports 28^d will be closed by the cap but that when the plunger is depressed such ports will open and the central hole 28^c of the plunger will be in communication with the central bore of the blow-pipe through the central chamber of the gear 26. In the movement of the blow-pipes in the operation of the machine, as will be hereinafter described, their upper ends, will at certain times, be brought beneath the peripherial extensions 8 of the top plate 5ᵃ and at such times the plungers will be depressed. Each of these projections is provided on its under surface with a bushed air port 29 connected with the chamber 15, by the passage 29ᵃ, the several passages being controlled by air valves 30 (see Fig. 3) of proper contruction, whose stems 30ᵃ extend through the top plate 5ᵃ and are adapted to be depressed by a crown cam 30ᵇ on the lower surface of the fixed plate 20, whereby on the rotation of the head 5 the valves will be actuated at proper times to place the ports 29 into connection with the air reservoir 15. The bushed port 29 is by preference provided with a recess 29ᵇ into which the plunger 28ᵃ is adapted to enter, thereby securely holding the upper end of the blow-pipe in registration with the port and in connection therewith. For the purpose of guiding and locating the blow-pipe at such times a bracket 29ᶜ projects radially from the outer face of the annular outer wall 5ᶜ below each of the peripherial extensions 8 and has its outer end bifurcated to receive the blow-pipe and properly center it.

The mechanism above described is to admit air for the purpose of blowing as is usual but it has further been found advantageous to exercise a control over the pressure in the gather prior to the blowing. As at such times the blow-pipe is not so located as to be adjacent to the air port other means are provided for this purpose. As shown such means consists of a pump cylinder 31 secured to the rear face of each of the blow-pipe carrying frames 16. The longitudinal bore in the blow-pipe cross head 21ᵇ is provided with a central enlargement 31ᵃ and the blow-pipe has radial apertures 22ᵇ communicating between its central bore and such enlargement. The stem 21ᵃ has a central passage 31ᵇ extending from such enlarged recess to its opposite end where it is closed by a plug 31ᶜ and where it has radial ports 31ᵈ whose outer ends terminate in an annular groove 31ᵉ in the sleeve near its end. Surrounding the end of the stem is a collar 32 which is interposed between the hub of the bevelled gear 23 and the cap 31ᶠ on the extreme rear end of the stem. The collar 32 has in its one side an aperture 32ᵃ which registers with the annular groove 31ᵉ in the stem and is connected with the cylinder 31 by the pipe 32ᵇ in which is interposed the check valve 32ᶜ, whereby air can flow from said cylinder through the central passage 31ᵇ of the stem into the interior of the blow-pipe.

Within the cylinder 31 is contained the piston 33 normally thrown out by the spring 33ᵃ to draw air in through the induction valve 32ᵈ. The piston 33 has on its outer end a roller 33ᵇ adapted to be struck by a cam 34 carried on the gear 23 and thus on the stem of the blow-pipe support, and being thus adapted to drive the piston within the cylinder to force a puff of air into the blow-pipe at the proper time. In order to provide for variation in this time and further to permit a reciprocating rotary motion of the blow-pipe stem 21ᵃ with the puff occurring only when the stem is moving in one direction, I employ the construction shown in Fig. 9 in which the cam 34 is in the shape of an arm pivoted at 34ᵇ to a sector plate 34ᵃ, the arm being held at about the position shown by a spring 34ᵈ. With this construction when the stem 21ᵃ is rotated in the direction of the arrow in Fig. 9, the arm 34 will pass the roller 33ᵇ without actuation of the pump and plunger, due to the turning of the arm upon its pivot and will after passing the same immediately swing back to the position shown. Upon the reverse rotation of the stem however the notched free end of the arm will become seated on the roller and will result in an inward stroke of the plunger until the arm finally slides by, the movement of the arm in this direction being limited by the stop pin 34ᶜ. In order to provide for a change in the time at which this inward stroke of the plunger takes place and thus a change of the time of the puff of air admitted to the blow-pipe, the sector plate is angularly adjustable on and in respect to the stem 21ᵃ by mounting the sector plate on a disc 35 it being secured by the T slots 35ᵃ formed in the disc and by proper clamping bolts 35ᵇ entering the same. It will be noted that as at the time of the puff the blow-pipe is not underneath the extension 8 on the head but that the upper end of the bore of the blow-pipe is sealed by reason of the fact that the plunger 28ᵃ is at such times projected by its spring and thus the escape of the air at such period is prevented.

*The Marverer* (Figures 1, 2, 3, 16, 18 and 19).—On the upper flange 7ᵃ of each of the arms 7 and projecting to the front side thereof is secured a marverer or block 36 of suitable configuration, each marverer being arc shaped with its center of curvature at the axis of the stem of the corresponding blow-pipe support when the blow-pipe frame carrying such support is extended outwardly on its supporting arm parallel with the axis thereof, and being so positioned that the blow-pipe when swung at such time on the horizontal pivot formed by the stem of its support will have the gather thereon in contact with the marverer. Front as here used has reference to the direction of movement of the arm. It is desirable during the marvering to cause a relative approach of the marverer and blow-pipe as the gather is being worked down and therefore the marverer is carried through a hinge joint 36ᵃ from a bracket 36ᵇ fastened to the top flange of the arm 7, the axis of the hinge being tangential to the arc upon which the marverer is struck, or parallel to such tangent. The marverer is pressed in the direction of the gather by a spring 36ᶜ. A bell crank lever 37 mounted upon a bracket 37ᵃ carried by the arm 7 has one end thereof bifurcated and engaging a flange 36ᵈ upon the marverer and has its opposite end adapted to be struck by a cam 37ᵇ carried by and from the fixed plate 20, the shape of the surface 37ᵇ of such cam being such that it will cause a proper motion of the bell crank lever 37 to permit a limited movement of the marverer upon its pivot by the spring 36ᵃ and thus control the inclination of the marvering face thereof to the plane in which the blow-pipe is swinging. Inasmuch as the pivotal point of the marverer is below its lower edge this causes the marverer during the marvering to have gradual movement from a position which at the commencement of the marvering may be inclined away from the plane of the blow-pipe to a position to approach parallelism with such plane, the action of the marverer being to press the glass away from the end of the pipe and to cause a proper distribution thereon.

The marverer is by preferance hollow and is provided with means for introducing into and removing therefrom (such as the pipes 36ᵉ, which may be flexible) a suitable fluid by which its temperature may be regulated. Such fluid may be water or air, heated or cooled, as may be necessary to keep the marvering surface at the desired temperature.

*The molds and mold actuating mechanism* (Figs. 2, 3, 5, 10, 11 and 14).—Each of the spider arms 4ᵇ is radially bored to form a bearing for a tubular shaft 38 rotatable therein, such shaft terminating beyond the arm in a cross head 38ᵃ, to the one end of which cross head (the forward end) the two halves of a separable mold 39 are pivoted by their ears 39ᵃ and 39ᵇ respectively and the pivot bolt 39ᶜ. A gear 40 is formed upon the tubular shaft and is in mesh with the rack 40ᵃ sliding in an inclined guide 40ᵇ in the spider arm, the lower end of the rack being inclined forwardly and carrying a roller 40ᵉ running upon the crown of a concentric cam track 40ᵈ formed upon or attached to the base 1, so that in the rotation of the spider with the sleeve 3, the roller running upon the cam track will so shift the rack as to reciprocatingly rotate the tubular shaft and will impart such motion to the mold parts carried by the outer end thereof as will cause them to hang below the tubular shaft with the axes of their mold cavities horizontal or will cause them to swing upwardly and assume a position in which the axes of their mold cavities will be vertical.

Within the tubular shaft 38 is contained the rotatable horizontally reciprocating shaft 41 having fast upon its inner end a collar 41ᵐ having separable flanges 41ⁿ and 41ᵒ, in the channel between which is rotatably mounted a disc 41ᵖ which has on one part of its periphery a stud roller 41ᑫ which is located in a cam track 44 in an annular casting 44ᵃ mounted upon the base 1. Rotation of the disc 41ᵖ is prevented by the bifurcated extension 41ʳ upon the disc, which extension straddles the web of the arm 4ᵇ of the spider, thus holding the roller 41ᑫ in the cam track. The outer end of the shaft 41 which projects beyond the tubular shaft 38 carries a cross head 41ᵃ slidably mounted thereon and normally held at its outer limit of movement against the set nuts 41ᵇ by a spiral spring 41ᶜ interposed between it and a washer 41ᵈ mounted upon the shaft 41. One end of the cross head 41ᵃ is connected by a link 42 with the rearward extension of one of the ears 39ᵇ of one part of the mold and the other end of the cross head is connected by a link 43 with one end of a bell crank lever 43ᵃ pivoted to the rearward extension of the cross-head 38ᵃ on the tubular shaft 38, the other end of such lever being connected by a link 43ᵇ with one of the ears 39ᵃ of the other half of the mold, so that when the reciprocating shaft 41 is by the cam track 44 projected outwardly such movement will be communicated to the link 42 and directly swing inwardly half of the mold on the pivot bolt 39ᶜ to close and will through the link 43, bell crank 43ᵃ and link 43ᵇ be also transmitted to the other half of the mold to throw it outwardly upon the pivot bolt to close. The terms "outwardly" and "inwardly" here used have reference to the movement of the mold parts as measured from the vertical axis of the machine. The shape of the cam 44 is such that the molds are opened at all times when the axes of their central mold cavities are horizontal and are closed and reopened when the molds have been so swung that the axes of such cavities are vertical.

The mounting of the spider in respect to the head and the arrangement of the mold parts therein is such that when each mold is raised and closed the axis of its cavity will be below one of the air blowing ports 29 and at such a distance therebelow that a blow-pipe when placed vertically below such port with its upper end against the same will have the gather thereon contained within the cavity of the mold corresponding thereto.

As the mold carrying spider 4 and the blow-pipe carrying head 5 are each rigidly connected to the sleeve 3, they rotate in unison around the vertical axis formed by the standard 2. Each mold mechanism has therefor a corresponding blow-pipe mechanism with which it cooperates, it having at no time any cooperation with any other. Each mold and its cooperating blow-pipe mechanism therefor forms a unit, which is fully operative in itself and whose action is not in any way modified or altered by the presence of other similar units and while my invention may be embodied in a machine having but one unit, for the purpose of increasing the output and economizing space around the furnace mouth, it is preferably to provide a plurality of such units. Presuming the machine be set opposite and adjacent to the mouth of a suitable glass furnace, the rotation of the machine results as before stated in an angular movement of the unit as a whole (or if a plurality of units be employed of each unit as a whole and all of such units together) around the vertical axis of rotation, whereby they will be at a part of their path of movement opposite the furnace mouth, and whereby the several units above referred to will in their travel be brought into cooperative relation with non-travelling parts, whereby proper actuation will be given to the elements constituting such units to cause the units to perform the various acts attendant upon the production of the article, among which are raising and lowering, and opening and closing the mold, and the manipulation of the blow iron.

It will be further noticed that each blow-pipe has not only the movement it has in common with the other elements of the same unit around the vertical axis formed by the standard 2 but has a movement of translation in a horizontal plane in respect to the mold forming parts of the same unit, such translating movement being due to the pivotal mounting of its blow-pipe supporting frame 16, and being utilized to present and position the blow-pipe in the glass furnace and to interpose it between the air port and the mold. Each blow-pipe has further an additional movement in a vertical plane which is provided by the horizontal pivotal mounting on the stem 21, which movement cooperates with its horizontal translating movement to properly present its end to the glass in the pot, and to provide for marvering of the gather, the subsequent swinging thereof and permits the blow-pipe at the time it is interposed between the air port and the mold to be vertical.

With these units are also combined certain elements, viz., a crack off, a cleaner and a cooling tank, which in the travel of such units around the vertical axis act upon the elements of each of the units successively.

*Mold cooling* (Figs. 2, 3 and 5).—The cooling tank 45 is attached to the side of the base 1 and extends in an arc of a circle on that side thereof which will be adjacent to the furnace when the machine is properly located and is filled to a proper level with water, the molds dipping into the water and travelling axially therein when they are lowered.

Figure 5:
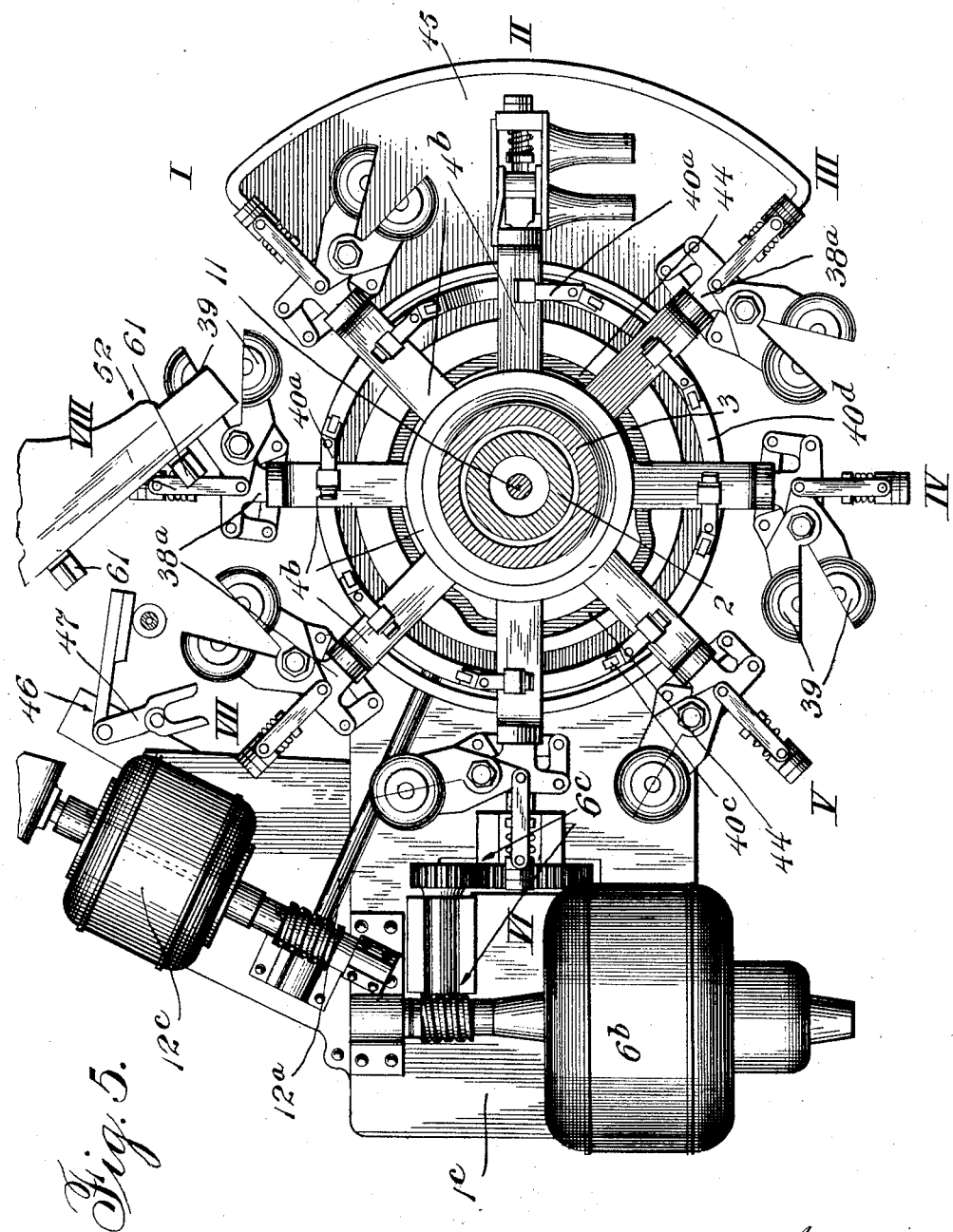
Fig. 5 is a horizontal section on line $x^5$—$x^5$ of Fig. 2.

*The crack-off* (Figs. 5, 20 and 21).—The crack-off 46 comprises a sleeve 46ᵃ mounted upon a vertical post 46ᵇ carried by the extension base 1ᵉ preferably at about the point shown in Fig. 5 in respect to the cooling tank, the sleeve being vertically adjustable on the post by means of the collar 46ᶜ and set screw 46ᵈ. From the uper end of the sleeve is carried a radial arm 47 normally projected inward towards and into the path of the advancing blow-pipe by a spring 48, the arm terminating in a finger 47ᵃ and has pivoted thereto a finger 47ᵇ extending substantially parallel with and slightly from the finger 47ᵃ, towards which it is pressed by a spring 47ᶜ, the fingers forming between them a slot 47ᵈ, the edges of the fingers forming such slot being somewhat thinned as at 47ᵉ. The height of the crack-off is so adjusted that the edges 47ᵉ are about or slightly below the plane in which the top of the molds travel and the mouth of the slot is so positioned by the spring 48 and the set screw 46ᵈ and the stop arm 46ᵉ on the sleeve cooperating therewith, that it will receive each blow-pipe as the latter is caused to travel by the rotation of the head and that then the continuued movement of the blow-pipe 22 will cause the blow-pipe to slide towards the base of the slot 47ᵈ and then to reverse its movement and disengage itself therefrom. During this period the arm 47 is swung with the blow-pipe on its vertical axis formed by the post 46ᵇ, tensioning the spring 48 and the neck of the bulb is scored at the point where it is desired to break it from the blow-pipe. Near its lower end the sleeve 46 has attached thereto a knocker arm 49 angularly displaced in respect to the arm 47 and provided with a cushion 49ᵃ, the knocker arm 49 being so positioned that, when the blow-pipe escapes from the slot in the arm 47 and the sleeve and parts thereon are thrown back towards normal position to permit the slot to engage the following blow-pipe, the cushion 49ᵃ will strike the finished bulb and knock it off from the pipe at the line scored by the edges 47ᵉ, the bulb dropping into any suitable receptacle that may be provided for this purpose.

In order to relieve the blow-pipe of the strain which would be attendant upon thereby swinging the crack-off in the manner before described, I provide for each blow-pipe a stud 50 located in the axial line of the blow-pipe at the crack-off position and at sufficient distance below the lower end thereof to clear the bulb carried thereon, the studs being carried upon the ends of the bracket arms 50ª fastened to the arms 4ᵇ of the mold carrying spider and projecting outwardly and rearwardly therefrom in such a manner as to clear the mold actuating mechanism of the same arm and the mold carried on the following arm. As shown the studs each are carried from the spider arm of the mold corresponding to the blow-pipe in advance of that to which the stud corresponds. Each of these studs cooperates in turn and successively with an actuating arm 51, having a shape and length substantially similar to that of the fixed finger 47ª of the crack-off, carried from the sleeve 46ª, so that the swinging movement of the crack-off will be due to the contact of the stud 50 with the actuating arm 51.

*The cleaning mechanism.*—For the purpose of removing the moil from the end of the blow-pipe after the finished bulb has been removed by the crack-off I provide a cleaning mechanism shown in Figs. 5, 21, 22, 23 and 24 and including striker arms adapted to act upon the blow pipe during its travel around the vertical axis formed by the vertical standard and after the crack-off has acted thereon, and a support for the blow-pipe at such time, the striker arms and support being adapted to move with the blow-pipe during the proper interval to effect the cleaning and to be automatically returned to the position in which they will be adapted to receive the succeeding blow-pipe. For this purpose a cleaner casting 52 is pivoted to one end of a radius bar 53 carried by a bracket 53ª from the extension base 1ᶜ adjacent to the motor 12ᶜ. The shaft of the motor extends through and has a bearing in the vertical part 53ᵇ of the bracket, and has fast on the outer end thereof a bevelled pinion 54 meshing with a bevelled gear 54ª on the vertical shaft 54ᵇ carried in the horizontal parts 53ᶜ of the bracket, the radius bar being sleeved upon such shaft. Near its upper end the vertical shaft has keyed thereto a bevelled pinion 54ᶜ meshing with a bevelled gear 55ª on the inner end of a horizontal shaft 55 carried in bearings 53ᵈ in the radius bar. A second shaft 56 in alignment with the shaft 55 is carried in bearings 53ᵉ in the outer end of the radius bar, being adapted to be connected to the shaft 55 by a clutch 57 and has fast upon its outer end a bevelled pinion 56ª gearing with an idler 58 mounted upon a vertical pin 58ª in the outer end of the radius bar, on which pin is pivoted ears 52ª formed upon the rear face of the cleaner casting. A horizontal shaft 59 is mounted in the casting and has upon the outer end thereof a bevelled pinion 59ª meshing with the idler 58 and near its inner end a gear wheel 59ᵇ, the latter being located on the front face of the casting and meshing with a second gear wheel 60 of corresponding size mounted upon a second horizontal shaft 60ª also carried in the casting. The forward ends of the shafts 59 and 60ª have secured thereto striker arms 61 having concaved ends adapted to jointly encircle the lower end of the blow-pipe, and in their rotation, caused by the transmitting gear before described, to strike the top of the moil upon the blow-pipe and to knock and scrape the same therefrom. For the purpose of protecting the gears from the glass fragments resulting from this operation the gears are covered by a plate 62 bolted to the face of the casting and which also affords a support for the outer end of the shafts immediately adjacent to and behind the arms.

The casting 52 has depending from the central part thereof a leg or standard 52ᵇ provided at its lower end with a suitable bearing 52ᶜ, such as a ball, running upon a bracket 63 bolted to one side of the base 1 of the machine, by which means the strain, due to the weight of the casting will be taken off the radius bar. A plate 64 is secured to the standard near the lower end thereof and has immediately beneath the middle of the line connecting the centers of movement of the striker arms (and which is the cleaning point) a notch 64ª adapted to receive the stud 50 corresponding to the blow-pipe to be cleaned, the plate in the rear of the said notch extending somewhat towards the center of the machine and then sloping gradually backward towards the face of the casting, as at 64ᵇ.

In the operation of the device the parts will normally have the position shown in Fig. 21 in which the cleaning mechanism will be positioned to receive the end of a blow-pipe after the same has passed the crack-off mechanism. When the blow-pipe has by its advancing movement been centrally positioned between the striker arms (which at this time will not be at the point of greatest approach to each other) the stud 50 will engage the notch 64ª in the bottom plate 64 of the casting 52 and start movement of the latter. The rigid drive afforded by the stud results in the cleaner being given such movement as will cause the cleaning point to move in unison with the blow-pipe around the arc of a circle in which the blow-pipe is moving at this time, this being due not only to a swinging of the casting upon the pin 58ª at the outer end of the radius bar but also to a movement of the radius bar itself about the vertical shaft 54ᵇ at its inner end and by which it is carried. The clutch 57 interposed between the two shafts in the radius bar comprises two members 57ª and 57ᵇ normally held open by a spring 57ᶜ, the movable member 57ᵇ being engaged by a yoke lever 57ᵈ projecting through the upper member of the radius bar frame. An arm 65 carried from the cleaner casting lies, in the normal position of the parts, behind the upper end of the yoke lever and is provided with a bevelled portion 65ª which on the movement of the cleaner casting, due to the stud as before described, moves the yoke lever to temporarily engage the clutch mechanism. The shaft 55 is constantly driven from the motor and the rotary movement imparted to the movable member 57ᵇ of the clutch during the period in which the clutch members are held closed by the bevel 65ª on the arm results in such angular movement of the movable member as to carry a notched portion 65ᵇ thereof away from a stud 65ᶜ rigidly carried on the radius bar, (the stud normally resting in the notched portion) and to bring an uncut portion of the movable member opposite such stud, whereby the clutch will be held closed after the yoke lever itself has been released by the continued swinging movement of the cleaner casting. The engagement of the clutch causes the rotation of the wheels 59ᵇ and 60 and causes the striker arms driven thereby to move in opposite directions and down upon the moil of the blow-pipe, which is thus struck forcibly and shattered. After this has taken place the continued travel of the blow-pipe in its path of movement brings the parts in position in which the stud 50 passes out of the notch 64ª in the plate 64 of the cleaner casting, after which the movements of the blow-pipe and cleaner casting cease to be synchronous. The blow-pipe continues its movement around the center of the machine and is swung up preparatory to making a fresh gather. The cleaner casting is prevented from swinging back to normal position, prior to the time the blow-pipe has been sufficiently swung for it to clear, by the engagement of the stud 50 with the portion 64ᵇ of the plate 64. Upon the release of the cleaner casting by the stud the rotational strains of the gears result in a restoration of the parts to normal position in which the cleaner will be positioned to receive the succeeding blow-pipe, this being aided if desired by spring mechanism. Upon the return of the cleaner casting to normal position, the clutch actuating arm 65 passes behind the end of the yoke lever 57ª, which is still at the forward limit of its movement, due to the fact that the clutch itself is still held closed by the stud 65ᶜ, and immediately after such restoration of the parts the rotation of the movable member of the clutch brings the cut-away portion thereof opposite the stud and the clutch spring 57ᶜ disengages the clutch, leaving all parts in their initial position.

For the purpose of supporting the lower end of the blow-pipe against the vertical strain resulting from the blows of the striker arms upon the top of the moil, I provide an anvil in the form of a lever 66, pivoted at 66ª in the casting, having upon its inner end a conical nose 66ᵇ adapted to enter the lower end of the bore of the blow-pipe when the rear end of such lever is depressed and this depression I effect by means of a cam 66ᶜ secured to the rear face of the wheel 60, the cam being adapted to depress the rear end of such lever prior to the time the striker arms hit the moil and to thus lift the nose 66ᵇ to support the blow-pipe during the period in which it is subjected to the vertical strain. I further provide means for cleaning fragments of glass from the end of the blow-pipe which would not be reached by the striker arms and this I accomplish by pivoting a second lever 67 in the casting below the lever 66 and form its outer end into a scraper blade 67ª shaped symmetrically with respect to the lower end of the blow-pipe, the rear end of the scraper lever extending upwardly and being adapted to contact with the broadened portion 68ᵇ of the cam 66ᶜ, such portion of the cam being so positioned that the scraper is brought into action only after the striker arms have struck the moil and have continued their movement sufficiently far to clear the scraper. The nose of the supporting lever 66 is normally held depressed by means of a spring 66ᵈ and I interpose between the two levers a leaf spring 67ᵉ whereby the scraper lever 67 will also normally be held away from the blow-pipe.

Figure 28:
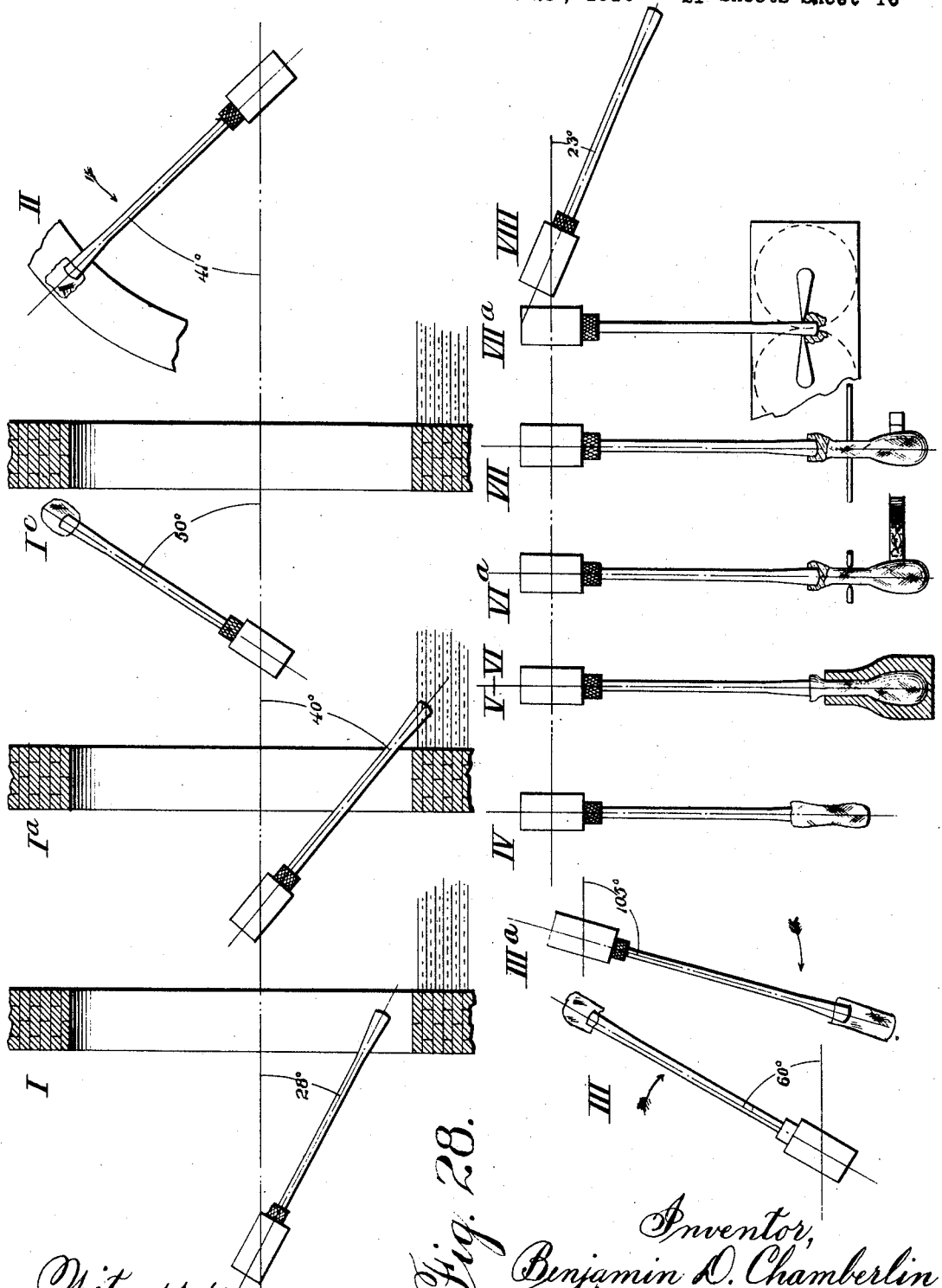
Fig. 28 is a series of diagrams representing the positions assumed by the blow-pipes at various times as projected in vertical planes parallel with the axes of the respective blow-pipes and representing also the parts co-acting with the blow-pipe in its several positions.

*Operation.*—Presuming that the machine is properly located in front of and in proximity to the mouth of the furnace and that the two motors are running, the operation will be as follows, it being remembered that with the construction here shown the several units are in constant movement around the vertical axis formed by the standard and that the main air pumps are constantly supplying air to the air reservoir and that the blow-pipes are in constant rotation about their longitudinal axes. In this description the operation of a single unit will be only considered and it is presumed that the unit occupies position I of the several figures, and that the machine is so located that the blow-pipe of the arm corresponding to this position is partly projected in the mouth of a suitable glass furnace, as indicated in full lines in Fig. 27, the outer end of the blow-pipe frame being in front of the radial line of the arm 7 on which it is carried, with the blow-pipe carried thereon extending outwardly and downwardly. In Fig. 28 I have indicated several of the positions of the blow-pipe when projected on a vertical plane parallel with its longitudinal axis, and such initial position of the blow-pipe is represented in the diagram I thereof. As the arm 7 is carried to position I$^a$, shown in dotted lines in Fig. 27 and in Fig. 28 the blow-pipe frame 16 swings rearwardly on its vertical joint with such arm, projecting the end of the blow-pipe further into the furnace mouth, and the blow-pipe is swung on its horizontal pivotal mounting to depress the gathering end thereof into the glass, it being understood that the movement of the frame on the arm is accomplished by the cam track 19 and the movement of the blow-pipe on its horizontal pivot by the cam track 25, the cam ways being properly shaped to effect the respective movement above described and others to be hereinafter described.

Upon the arm moving from position I$^a$ to position I$^b$ (Fig. 27) the blow-pipe frame is swung further to the rear on the arm, the effect of such movement of the frame when compounded with the movement of the arm 7 around the central vertical standard being to hold the end of the blow-pipe practically stationary in the glass to give time to properly gather. As the arm moves from position I$^b$ to I$^c$ the frame is swung further rearwardly in respect thereto, withdrawing the blow-pipe from the furnace and the end of the blow-pipe is also lifted during this period in order that it may clear the side walls of the furnace mouth (see diagram I$^c$, Fig. 28). As the arm moves from position I$^c$ to position II, the blow-pipe frame swings rapidly forward on its vertical pivot with the arm 7 until it lies parallel with the radial axis of the arm and the outer end of the blow-pipe swings up above its horizontal pivot and moving down past its highest point, the gathered glass thereon is rolled in the marverer.

While the arm moves from position II to position III the blow-pipe frame remains extended on the radial line of the arm and the gather upon the blow-pipe after swinging downwardly through a proper arc has its swinging reversed, rolling along the marverer, the position of which in respect to the plane in which the blow-pipe travels is controlled by the marverer actuating mechanism before described. Slightly after the gather has in this retrograde motion passed the highest point in the arc in which it swings (see position III) a puff of air is fed thereto by the air pump, thus swelling the bulb and assisting the shaping thereof and the bulb then descends rapidly, swinging under the pivotal point and past the vertical thereto, (see position III$^a$, Fig. 28) and oscillates back and forth, such motion of the gather in its circular path resulting in the shaping of the bulb as is well known.

The corresponding mold, which at position I was open with its mold cavity vertical, drops as it advances in its path into the cooling tank, where it is wetted as is usual with paste molds, and after travelling in the water therein arises at position III from the tank, it still being open.

As the parts swing into position IV, the blow-pipe is brought into a vertical position with the gather end down and moves the blow-pipe frame on its vertical pivot and the outer end thereof swings forwardly and inwardly until the upper end of the blow-pipe is presented under the air port, the gather upon the lower end thereof during this movement entering between the still open halves of the mold, which on the continued movement of the arm towards position V are closed thereon, such motion of the arm opening the valve to admit blowing air into the gather. This position of the parts continues through VI.

After the arm passes position VI the mold opens and the blow-pipe frame swings outwardly on its vertical connection with the arm 7 (the blow-pipe remaining vertical), removing the blown bulb from between the mold halves and so positioning it that the continued travel of the arm causes its neck to first enter the slot 47$^d$ of the crack-off arm 47 (see position VI$^a$, Figs. 27 and 28). The forward movement of the arm 7, in connection with the movement of the crack-off arm resulting from the engagement above specified, causes the bulb neck to run down towards the base of the slot (position VI$^b$, Fig. 27) and to finally run out of the same and permitting it and the crack-off arm connected thereto to be restored to normal position by its spring 48, the latter arm in this movement, which occurs about position VII, striking the bulb, which falls from off the blow-pipe.

After the bulb has been knocked from off the blow-pipe the continued travel of the blow-pipe locates the same in cleaning position in respect to the cleaner. Through the mechanism above described the cleaner partakes of the movement of the blow-pipe and the arms thereon to remove the moil, after which the cleaner is freed for return movement and swings back to normal position, the mold corresponding to the blow-pipe being partly closed, if necessary, to permit the return of the cleaner without interference therewith. During this cleaning period the blow-pipe remains vertical as shown in position 7$^a$ of Fig. 28 and then the blow-pipe frame swings forwardly and outwardly on its vertical pivot on its carrying arm 7 and the blow-pipe swings on its horizontal axis to lift the gathering end of the blow-pipe, the blow-pipe taking the position shown in position VIII of Fig. 28, from which it moves to position I, to repeat its operation, the end of the blow-pipe, if necessary, to clear the furnace, being raised above the level of its horizontal pivot during this time.

For the purpose of providing an adjustable means for regulating the elevation of the end of the blow-pipe during the gathering period, I prefer to make the corresponding part of the blow-pipe lifting cam run 25 in the manner illustrated in Fig. 26 in which as shown a part of the inner wall of the cam run is removed and replaced by a block 68 provided with elongated slots through which pass the securing bolts 68ᵃ. The outer part of the cam run opposite thereto is also removed and replaced by the movable section 68ᵇ pressed inwardly by the flat spring 68ᶜ. It will be seen that by shifting the radial position of the removable section 68 of the inner wall the elevation of the gathering end of the blow-pipe may be varied, and to provide a means for controlling the times at which the blow-pipes will be lowered and lifted I pivot to the plate 20 on each side of the movable section a curved section 68ᵈ, each of which is also provided with a slot through which the bolts 68ᵃ pass. These curved pieces may be shifted upon their pivots and so secured that their outer edges form a part of the inner wall of the cam run at the lowering and lifting intervals.

*Alternative marverers.*—Under certain conditions it is inadvisable to swing the marverer overhead prior to the marvering and in such cases I provide the mechanism shown in Figs. 29 to 31 whereby this can be avoided. In these figures, to avoid confusion, the mechanisms for moving the blow-pipe frame and swinging the blow-pipe are omitted, they being the same as those previously described and I carry a supplemental frame 70 upon the head of the machine by brackets 70ᵃ adjacent to each of the arms 7 and in front thereof, the frame having pivoted in its outer end a bar 71, upon the outer end of which a marverer 72 having a vertical and a horizontal marvering face 72ᵃ and 72ᵇ is secured. The bar carries concentrically with its pivotal point a pinion 71ᵇ meshing with the rack 73ᵃ upon the outer end of the reciprocating link 73 carried in the supplemental frame, the rear end of the link having thereon a roller taking in the cam track 73ᵇ formed upon the cam plate 20. This cam track is so shaped that the marverer bar is normally held up (see dotted Fig. 31) to permit the passage of the arm upon which the marverer is located past the furnace, but immediately thereafter the marverer is lowered until its bar is practically horizontal. During this lowering of the marvering bar the blow-pipe frame has swung out radially in respect to its supporting arm and the marvering end of the blow-pipe has been lifted to a marvering position in which it is somewhat above the horizontal and the blow-pipe carrying frame is then swung rearwardly so as to bring the gather thereon against the vertical face 72ᵃ of the marverer, the gathering end of the blow-pipe rolling the gather thereon due to its vertical oscillation about its horizontal pivot on the frame 16, but if desired the marvering may be accomplished on the horizontal face of the marverer by swinging the blow-pipe carrying frame 16 upon the arm with the gather resting upon such horizontal face. After the marvering the blow-pipe carrying arm is then swung forwardly to clear the gather from the marverer and the blow-pipe is slightly raised to receive the initial puff (as shown in dotted lines in Fig. 31) and the operation of swinging and blowing, etc., are performed as before described, the marverer being raised to its initial position by means of the cam track above mentioned.

In lieu of the marvering mechanisms before described I may use that shown in Figs. 32, 33, 34, 35 and 36. In these figures, as in that just described, the marverer is capable of being swung up vertically around a horizontal pivot for the purpose of clearing the furnace and of being lowered for the purpose of marvering at a point slightly above the horizontal plane of the pivot of the blow-pipe. The marverer 74, itself consists of a hub 74ᵃ to which is secured a marvering face 74ᵇ in the form of the interior of a frustrum of a cone, one part 74ᶜ of the cone being open to permit the introduction of the marverer into the interior thereof. The hub is mounted upon the outer end of a shaft 75 carried in bearings 76ᵃ in a frame 76 pivoted upon a horizontal stud 76ᵇ to an extension 77 formed upon the end of the arm 7 which carries the corresponding blow-pipe. A gear 76ᶜ is fast upon the frame 76, concentric with its pivotal point, and meshes with a pinion 78ᵃ keyed to a horizontal shaft 78, which is carried in bearings 77ᵃ and 79 carried by the extension 77 and the radial bar 9 located above the arm 7 upon which the extension is formed. Two gears 80 and 80ᵃ are sleeved upon the horizontal shaft and mesh with pinions 81 and 81ᵃ, the former of which is formed upon the hub of the bevelled pinion 27ᶜ through which the blow-pipe is rotated, while the latter is formed upon the hub of a second bevelled pinion 81ᵇ, sleeved on the driving shaft 27ᵈ and engaging and being driven by the bevelled gear 27ᵇ at a point diametrically opposite to that at which the pinion 27ᶜ engages the gear. Thus the two gears 80 and 80ᵃ are reversely rotated. As before stated the gears 80 and 80ᵃ are loose upon the shaft 78 but either is adapted to be locked thereto and for this purpose the said gears have clutch teeth 80ᵇ formed upon their opposing faces, between which faces a block 82 provided with corresponding clutch teeth is adapted to slide upon shaft 78, being feathered thereto by a pin 82ᵇ which also passes through a rod 83 located within the inner end of such shaft, the end of such rod projecting beyond the end of the shaft and bearing upon the lever 83ᶜ pivoted to a projection from the radial bar 9, being normally held against such lever by means of a coil spring 83ᵈ. The lower end of the lever carries a roller 83ᵉ taking into a cam track 83ᶠ upon the upper face of the cam plate 20, the cam track being so shaped as to, at different times, hold the clutch block intermediate of the gears 80 and 80ᵃ or in engagement with one or the other. The bevelled pinion 78ᵃ upon the horizontal shaft 78 is mutilated, that is to say has the teeth upon a portion of its periphery cut-away, whereby when such mutilated portion of the pinion comes into the line of centers the driving effect of the shaft 78 upon the marverer carrying frame 76 will be lost, but at other times the rotation of the shaft 78 will cause a movement of the marvering frame around its horizontal pivot. A second wheel 84 is formed upon the horizontal shaft 78 and either meshes or frictionally drives a corresponding wheel 84ᵃ formed upon the inner end of the marverer shaft. With the parts thus arranged and located the action is as follows: Presume that the marverer frame is so located in respect to its pivot that the marverer is raised and is held with the back stop 76ᵈ formed on the frame 76 resting on the bearing 77ᵃ of the horizontal shaft (see dotted Fig. 33) so that the marverer can freely pass the furnace. Further presume that a mutilated portion of the pinion 78ᵃ is in the line of centers and that the clutch block 82 is intermediate of the two gears 80 and 80ᵃ being held in this position by the cam run 83ᶠ. The continued movement of the arm pertaining to the blow-pipe and marverer under consideration will cause the lever 83ᶜ to enter such part of the cam run as will throw the clutch block to lock the gear 80 to the horizontal shaft 78. This results in a rotation of the horizontal shaft in such direction as will cause the tooth portion of the mutilated bevel pinion 78ᵃ to engage the bevelled gearing 76ᶜ upon the marvering frame and to then cause the frame to descend to the position shown in full lines in Fig. 33, the blowpipe at this time having been so moved that the gather thereon is in a position to enter the cutaway portion 74ᶜ of the wall of the marverer 74 when the latter is lowered to its limit (see Fig. 34). When this latter has been effected the mutilated portion of the pinion 78 will again come into the line of centers and the continued rotation of the horizontal shaft will no longer affect the position of the marvering frame.

This lowering of the marverer brings the wheels 84 and 84ᵃ into engagement with each other and results in a rotation of the marverer shaft and of the marverer, which combined with the rotation of the blow-pipe upon its longitudinal axis results in the forming of the gather. After the marverer 70 has rotated through a desired arc the continued movement of the arm 7 around the vertical axis of motion of the machine causes the lever 83ᶜ to engage a portion of the cam run 83ᶠ whereby the engagement of the clutch block will be shifted from the gear 80 to the gear 80ᵃ resulting in a reversal of the direction of driving of the horizontal shaft and a corresponding reversal in the direction of rotation of the marverer, carrying the latter back to the position illustrated in Fig. 34. During this reversal of the rotation of the marverer a mutilated portion of the pinion 78ᵃ has been at the line of centers but at the termination thereof the teeth upon the pinion again engages the bevelled gear 76ᶜ upon the marverer frame and swings the latter upon its horizontal pivot to restore the marverer to its initial position, after which the lever 83ᶜ engages a portion of the cam run 83ᶠ and disengages the clutch block 82 from the gear 80ᵃ and centers it between it and the gear 80, thus arresting the rotation of the horizontal shaft 78. If it is desired to have the marverer 74 stationary during the time that the gather is in contact therewith, which is desirable in blocking, the rotation of the marverer 74 may be arrested as soon as it has been turned through a sufficient angular distance to cause it to engage the gather. This could obviously be accomplished by so shaping the cam track that the clutch block 82, at a proper time, is thrown out of engagement with the gear 80, and held intermediate thereof and of the gear 80ᵃ, it being subsequently moved into engagement with the gear 80ᵃ when it is desired to return the parts to normal position.

*Hand Gathering.*—As above indicated the machine above described in its general features is applicable where it is desired to gather by hand and this can be accomplished by the use of a removable blow-pipe and the formation of the blow-pipe supports into suitable chucks adapted to receive such removable blow-pipes. In such a case the gathering mechanism of the machine will not be utilized and the marvering may be utilized or not dependent upon whether the gather is, or is not, hand marvered prior to the introduction of the removable blow-pipe into the machine. I have in Figs. 37 to 52, inclusive, shown mechanism by which a blow-pipe, on which a gather has been made by hand, can be inserted in and receive further treatment in the machine. This mechanism comprises generally, a chuck adapted to receive a removable blow-pipe and mechanism whereby the blow-pipe is automatically discharged from the chuck at the termination of the desired operations in the machine. In the following description I will presume that this is done after the cleaning. Inasmuch as the machine here shown in its preferred form utilizes a short blow-iron I have further provided a detachable handle adapted to manipulate a removable blow-pipe of the proper length for use in the machine. The manipulation here referred to includes not only the insertion of the blow-pipe in the furnace to effect the gather and its insertion in the blow-pipe chuck, but means for effecting a rotation of the blow-pipe on its longitudinal axis between such times, which rotation is necessary in order to preserve the uniformity of the gather by preventing the unequal flow of glass during this period.

The blow-pipe support 21 is of the identical structure used in the preferred form of the machine, and like such support carries the upper end or fixed part of the blow-pipe 22, the lower end of which terminates in an enlargement forming the body of the chuck 85 and provided with diametrical slots 85$^a$ and 85$^b$, one located above the other, and with longitudinal grooves 85$^c$ upon its periphery located above such transverse slots. A collar 86 surrounds the enlargement, being normally thrown upwardly thereon by means of spiral springs 86$^a$ contained within the longitudinal grooves 85$^c$ and between the fingers 86$^b$ projecting inwardly from the sleeve and a cross bar 85$^d$ contained within the slot 85$^b$, the cross bar carrying a packing which, with the cross bar, is centrally apertured to register with the central bore of the fixed part 22 of the blow-pipe. The enlargement of the fixed part of the blow-pipe is longitudinally bored as at 85$^f$ to receive the upper end of the removable blow-pipe 87 which enters the aperture in the cross bar. Pivoted within the lower diametrical slot 85$^a$ are chuck jaws 85$^e$ the outer ends of which lie beneath the lower end of the collar 86 and the inner ends of which are adapted to engage a peripherial groove 87$^a$ in the removable blow-pipe near the upper end thereof, whereby the blow-pipe when inserted in the central bore 85$^f$ of the enlargement will trip past the jaws and will be caught by the engagement of the latter with its peripherial groove, preventing the blow-pipe from falling out. When such a removable blow-pipe is inserted in the chuck the operations in the machine subsequent to such insertion (which would be generally speaking prior to the marvering) will be the same as those previously discussed in respect to the machine with the fixed blow-pipe, until it is desired to remove the blow-pipe. This may be automatically accomplished by a trip shown in Figs. 42, 43 and 44 consisting of a pair of fingers 88$^e$ pivoted by the horizontal pivot 88 to the outer wall 5$^c$ of the head casting and provided with an arm 88$^a$ extending upwardly through the top plate 5$^a$, where it is provided with an anti-friction roller 88$^b$ running upon the periphery of the cam plate 20, the roller being normally held in contact with the cam plate by a spring 88$^c$. A suitable cam portion 88$^d$ is formed upon the cam plate at the point where it is desired that the removable blow-pipe be discharged from the chuck and as the fingers 88$^e$ of the trip lie above an annlar flange 86$^c$ formed upon the collar of the chuck sleeve when the latter is located in the bracket, the downward movement of the outer ends of the fingers resulting from the engagement of the roller 88$^b$ with the cam part 88$^d$ will result in a downward movement of the chuck collar. This will cause a separation of the inner ends of the chuck jaws 85$^e$, causing them to disengage the blow-pipe, and such downward movement of the collar will be further transmitted through pins 86$^f$, contained within the springs 86$^a$, to the cross bar 85$^d$ against which the upper end of the removable blow-pipe is located, causing the latter to be forcibly ejected from its seat in the bore 85$^f$ of the enlargement and overcoming any frictional resistance by which it may be held.

In order to provide that the fingers 88$^e$ snugly embraces the collar when the blow-pipe is inserted beneath the blowing port, the trip is by preference mounted on a vertical pivot 89 so that it has a limited movement in a horizontal plane, a spring 89$^a$ being provided to hold it at one limit of such movement and in a position to properly receive the chuck collar when the latter, by the swinging of the blow-pipe arm, is brought toward the blowing port, it subsequently moving with the clutch until the blow-pipe is properly seated beneath the port. These positions are represented in full and dotted lines respectively, in Fig. 43.

It will be seen that the limit of length of the removable blow-pipe that may be employed is less than the distance between the blow-pipe support and the top of the molds and this is, in the construction which I prefer to employ, too slight to permit the direct handling of the blow-pipes to insert them into the furnace for gathering, so it is desirable to provide a handle by which they may be manipulated at this time and such means are shown in Figs. 45 to 51, respectively. As there shown the handle 90 consists of a sleeve or body portion 90$^a$ provided at its forward end with cheeks or pieces 90$^b$ formed by resilient plates, in the free ends of each of which are pivotally mounted blow-pipe engaging jaws 91 having concaved interior facing grooves, the lower parts of such jaws being rounded as at 91ᵃ. The forward upper edges of these jaws are connected by the transverse pin 91ᵇ on which between the jaws is sleeved the forward end of the link 92, the rear end of which bends toward the axial line of the handle and is pivoted at 92ᵇ in the bifurcated forward end of a piston 93 contained in the sleeve of the handle, the rear end of the piston being connected by a link 93ᵃ with the lever 93ᵇ pivoted at 93ᶜ in the stem, so that upon the movement of the lever in respect to the stem in the direction indicated by the arrow in Fig. 46 the pivotal jaws 91 at the forward ends of the handle will be rotated on their pivotal points to swing in the direction of the arrow there shown.

The removable blow-pipe has thereon a sleeve 94ᵃ so that when a handle, such as above described, is properly located above and pressed down upon the blow-pipe, the jaws 91 of the former will, due to their rounded lower edges, be separated to permit the passage of the sleeve of the blow-pipe into the longitudinal grooves of the jaws, where the blow-pipe will be firmly held by the resiliency of the cheeks. This insertion is made when the jaws have been so rotated on their pivots that the longitudinal grooves therein are substantially at right angles with the axis of the handle. By then throwing back the lever to the position shown in Fig. 46 the jaws and the blow-pipe contained therein will be swung upon the pivots of the jaws and brought into alignment with the handle as is represented in that figure, the handle having a cross brace or abutment 95 adapted to enter the annular groove 87ᵃ in the blow-pipe and thus steady the same. To insert a blow-pipe engaged in the handle into the chuck the lever 92 is again moved out of the axial line of the handle, bringing the blow-pipe contained within the block substantially at right angles thereto, and the blow-pipe while in the handle is then forcibly inserted in the central bore 85ᶠ of the enlargement of the fixed part of the blow-pipe, which bore at this time may be presented upwardly as shown in Fig. 52. This upward presentation of the fixed part of the blow-pipe, may of course, be effected by a suitable shaping of the cam plate 20 of the machine and indeed may be due to the movement which causes a lifting of the blow-pipe preparatory to marvering.

As above stated it is also desirable to provide for the rotation of the blow-pipe during the time it is being carried from the furnace to the machine and while it is being inserted in the latter. Indeed it is believed to be essential that this rotation be at no time interrupted prior to the marvering and to accomplish this I sleeve upon one of the jaws 91 a beveled segment 96 which is adapted to mesh with a corresponding gear 96ᵃ fast upon the blow-pipe and immediately adjacent to and below the sleeve 94ᵃ thereon. The hub of this segment is toothed and engages with a second segment 96ᵇ pivoted to one of the cheeks at 96ᶜ, such second segment being actuated by its connection to the forward end of a link 97 contained within the tubular stem, the rear end of which link is connected by a pin 97ᵃ working in a longitudinal slot in the stem with a sleeve 98 adapted to be reciprocated by hand upon the stem, so that at all times while the blow-pipe is in the handle it may be given a reciprocatory rotation by means of the longitudinal reciprocation of such sleeve. When the blow-pipe is inserted in the chuck the frictional engagement between such blow-pipe and chuck causes the rotation of the blow-pipe thereby even though at such times the handle is not removed from the blow-pipe. After the insertion of the blow-pipe in the chuck the handle may be removed by forcibly drawing it away. The sleeve 94ᵃ is held upon the blow-pipe between the bevelled gear 96ᵃ and the collar 96ᵈ.

Having thus described my invention what I claim and desire to secure by Letters Patent is:—

1. In a machine for the production of glass articles, the combination with a horizontally travelling frame, of a blow-pipe carried thereby and movable in respect to the frame in the direction of, and at angles to, the movement thereof, substantially as described.

2. In a machine for the production of glass articles, the combination with a rotating frame, of a blow-pipe frame pivoted on an axis parallel with the axis of rotation of the rotating frame and a blow-pipe pivoted to the blow-pipe frame on an axis at an angle to the pivotal axis of the blow-pipe frame.

3. In a machine for the production of glass articles, the combination with a horizontally travelling frame, of a blow-pipe carried thereby and movable in respect to the frame and in the direction of movement thereof, substantially as described.

4. In a machine for the production of glass articles, the combination with a travelling frame, a blow-pipe supporting frame vertically pivoted thereto, a blow-pipe horizontally pivoted in the blow-pipe supporting frame and means controlled by the movement of the travelling frame to oscillate the blow-pipe support upon its vertical pivot, and the blow-pipe upon its horizontal pivot to position the blow-pipe.

5. In a machine for the production of glass articles, the combination with a travelling frame, a blow-pipe supporting frame vertically pivoted thereto, a blow-pipe horizontally pivoted in the supporting frame and means for oscillating the blow pipe supporting frame and blow-pipe upon their respective axes to effect a gather of glass upon the blow-pipe, substantially as described.

6. In a machine for the production of glass articles, the combination with a rotary frame, a blow-pipe supporting frame having one of its ends vertically pivoted thereto, a blow-pipe horizontally pivoted in the opposite end of the frame, a stationary cam track and means controlled thereby for oscillating the blow pipe supporting frame and blow-pipe upon their respective axes to effect a gather of glass upon the blow-pipe, substantially as described.

7. In a machine for the production of glass articles, the combination with a travelling frame, of a blow-pipe support carried thereby but movable in respect thereto, a blow pipe carried in the support, and means for, at intervals, effecting such a rearward movement of the blow-pipe support in respect to the travelling frame as will maintain at such times the end of the blow-pipe substantially stationary, substantially as described.

8. In a machine for the production of glass articles, the combination with a travelling frame, of a blow-pipe pivoted thereto, and means for altering the angular position of the blow-pipe in respect to its line of movement with the frame, whereby the end of the blow-pipe is maintained substantially stationary during a part of the travel of the frame, substantially as described.

9. In a machine for the manufacture of glass articles, the combination of a travelling frame, a blow-pipe carried thereby, means for effecting at intervals such rearward movement of the blow-pipe in respect to the travelling frame as will maintain, at such times, the end of the blow-pipe substantially stationary and means for lowering the end of the blow-pipe at such times, substantially as described.

10. In a machine for the production of glass articles, the combination with a travelling frame, a blow-pipe pivoted thereto, means for altering the angular position of the blow-pipe in respect to its line of movement with the frame, whereby the end of the blow-pipe is maintained substantially stationary during a part of the travel of the frame, and means for depressing such substantially stationary end of the blow-pipe, substantially as described.

11. In a machine for the production of blown glass articles, the combination with a travelling frame, of a blow-pipe supported therefrom on a vertical and a horizontal axis, and means to swing the blow-pipe rearwardly upon the travelling frame to maintain the end of the blow-pipe substantially stationary and to then swing the blow-pipe further to the rear and swing the blow-pipe upon its horizontal axis to lift the end thereof, substantially as described.

12. In a machine for the production of glass articles, the combination of a frame travelling adjacent to the mouth of the furnace, a blow-pipe pivoted thereto and means for swinging the blow-pipe on the travelling frame to project the end of the blow-pipe into the furnace, and to then effect such a rearward movement of the blow-pipe in respect to the travelling frame as will maintain the end of the blow-pipe substantially stationary in the furnace, substantially as described.

13. In a machine for the production of glass articles, the combination of a frame travelling adjacent to the mouth of a glass furnace, a blow-pipe carrying frame pivoted thereto on a vertical axis, a blow-pipe pivoted in the carrying frame, on a horizontal axis, means for swinging the blow-pipe carrying frame on the travelling frame to project the blow-pipe into the furnace and to then effect such a rearward movement of the carrying frame in respect to the travelling frame as will maintain substantially stationary in the furnace the end of the blow-pipe, and means for oscillating the blow-pipe on its horizontal axis to immerse the end of the blow-pipe in the glass, substantially as described.

14. In a machine for the manufacture of glass articles, the combination of a frame travelling past the mouth of a furnace, a blow-pipe supporting frame pivoted thereto to oscillate in a horizontal plane, a blow-pipe carried by the supporting frame on a horizontal axis, means to swing the pivoted frame upon the travelling frame to project the blow-pipe into the furnace and to then effect such a rearward movement of the supporting frame as will maintain the end of the blow-pipe substantially stationary, means for oscillating the blow-pipe on its horizontal axis to immerse the end of the blow-pipe in the glass and means for simultaneously lifting the end of the blow-pipe and causing a rearward motion thereof, substantially as described.

15. In a machine for the manufacture of glass articles, the combination with a marverer, a blow-pipe supported for movement in two planes, and means for moving the blow-pipe in both planes to bring its end adjacent to the marverer and for rotating the blow-pipe while so adjacent, substantially as described.

16. In a machine for the manufacture of glass articles, the combination with a marverer, of a pivoted blow-pipe, means for effecting a translatory movement of the blow-pipe as a whole and for swinging the blow-pipe upon its pivot to bring the end thereof adjacent to the marverer and means for rotating the blow-pipe while so adjacent, substantially as described.

17. In a machine for the manufacture of glass articles, the combination with a marverer, of a blow-pipe supported for movement in two planes, and means for effecting a movement of the blow-pipe in one plane to place it in the marvering plane and for moving it in the other plane to bring its end adjacent to the marverer and for rotating the blow-pipe while so adjacent, substantially as described.

18. In a machine for the manufacture of glass articles, the combination with a marverer, a blow-pipe supporting frame, a blow-pipe pivoted thereon, means for swinging the supporting frame to move the blow-pipe as a whole into the marvering plane, and means for oscillating the blow-pipe on the supporting frame to bring its end adjacent to the marverer and for rotating the blow-pipe while so adjacent, substantially as described.

19. In a machine for the production of glass articles, the combination with a marverer, of a pivoted blow-pipe supporting frame, a blow-pipe pivoted on the said frame and means for swinging the supporting frame on its pivot to move the blow-pipe as a whole to position it in respect to the marverer and for rotating the blow-pipe while so adjacent and means for oscillating the blow-pipe on the frame to effect marvering, substantially as described.

20. In a machine for the production of glass articles, the combination with a marverer, of a blow-pipe supporting frame pivoted to oscillate in a horizontal plane in respect to the marverer, a blow-pipe carried by the frame on a horizontal axis and means for swinging the frame to position the blow-pipe carried thereby in respect to the marverer and for rotating the blow-pipe while so adjacent, and for oscillating the blow-pipe on its horizontal axis to effect the marvering, substantially as described.

21. The combination with an oscillating blow-pipe, of means for rotating the blow pipe, a marverer, and means for varying the position of the marverer in relation to the plane of oscillation of the blow-pipe while it is in operative relation with the blow-pipe, substantially as described.

22. The combination with a marverer, and a blow-pipe each pivotally mounted on an axis at an angle to the axis of the other, means for rotating the blow pipe and means for oscillating the blow-pipe to cause the end thereof to travel along the marvering face of the marverer and to simultaneously move the marverer upon its pivot, substantially as described.

23. The combination with an oscillating blow-pipe, of means for rotating the blow pipe, a marverer mounted to move to various inclinations in respect to the plane in which the blow-pipe oscillates and means for simultaneously oscillating the blow-pipe and varying the inclinations of the marverer, substantially as described.

24. The combination of a blow-pipe and means for rotating the same, of a marverer spring pressed towards the blow-pipe, a movable stop opposing the spring and means for simultaneously marvering the glass on the blow-pipe and withdrawing the stop to permit the feed of the marverer towards the blow-pipe, substantially as described.

25. The combination with a pivoted blow-pipe and means for rotating the same, of a marverer pivoted to move to various inclinations in respect to the plane in which the blow-pipe oscillates and a spring pressed towards such plane, a movable stop opposing such movement, and means for simultaneously oscillating the blow-pipe and withdrawing the movable stop to permit such movement of the marverer, substantially as described.

26. The combination with a travelling frame, of a marverer movably mounted thereon, a blow-pipe support mounted on the frame on a horizontal axis, a blow-pipe pivoted on the blow-pipe frame, means for rotating the blow pipe and means actuated by the movement of the travelling frame for oscillating the blow-pipe and simultaneously varying the position of the marverer in respect to the plane in which the blow-pipe oscillates, substantially as described.

27. The combination with a travelling frame, of a marverer movably mounted thereon, a blow-pipe supporting frame carried on the travelling frame by vertical axis, a blow-pipe mounted in the movable frame on a horizontal axis and means, actuated by the travel of the frame, for swinging the frame to position the blow-pipe carried thereby and for oscillating the blow-pipe to effect the marvering and for simultaneously varying the position of the marverer in respect to the plane in which the blow-pipe oscillates, substantially as described.

28. In a machine for producing blown glass articles, the combination with a travelling frame, a blow-pipe supporting frame pivoted on the frame, a blow-pipe pivoted in the supporting frame on a horizontal axis, means actuated by the movement of the travelling frame to move the blow-pipe frame thereon whereby the pivot of the blow-pipe is moved, and means actuated by the movement of the travelling frame to effect a swinging of the blow-pipe in the plane in which it was located by the movement of its frame, substantially as described.

29. In a glass blowing machine, the combination with a travelling frame, of blowing and molding mechanisms carried therein, a blow-pipe carried by the travelling frame, and means for moving the blow-pipe thereon to bring the blow-pipe in registration with the blowing and molding mechanisms and for removing it therefrom, substantially as described.

30. In a glass blowing machine, the combination with a molding device, of a blow-pipe supporting frame, a blow-pipe pivoted therein, means for turning the blow-pipe upon its pivot to locate the gather end thereof downwardly, and means for moving the supporting frame to effect a translatory movement of the blow-pipe as a whole and present the gather end thereof to the mold, substantially as described.

31. In a glass blowing machine, the combination with a blowing and a molding mechanism, of a blow-pipe supporting frame, a blow-pipe pivoted therein, means for moving the supporting frame to effect a translatory movement of the blow-pipe as a whole and insert it between the blowing and molding mechanisms and means for turning the blow-pipe upon the frame to locate the gather end thereof downwardly, substantially as described.

32. In a machine for the manufacture of blown glass articles, the combination with a travelling mold and its opening and closing mechanism, of a travelling blow-pipe support, mounted to swing on a horizontal axis, the path of movement of mold and support being such that at times the support is vertically over the mold and moving in unison therewith and is at other times located away from the path of movement of the mold, substantially as described.

33. In a machine for the manufacture of blown glass articles, the combination with a blowing mechanism, of a travelling frame, a mold travelling in unison therewith, a blow-pipe support mounted in the travelling frame, and capable of independent movement thereon and in respect to the mold mechanism and a blow-pipe carried on the frame and capable of swinging in a vertical plane, substantially as described.

34. In a machine for the production of glass articles, the combination with a blow-pipe carrying frame, of a blow-pipe pivotally mounted in the frame, cooperating mechanism adapted to operate upon the glass upon the blow-pipe to work the same and supported independently of the blow-pipe carrying frame, and means for moving the carrying frame and for moving the blow-pipe on the carrying frame to effect a gather of glass for subsequently moving the carrying frame to effect a translatory movement of the blow-pipe as a whole and the blow-pipe on the carrying frame to position the blow-pipe into operation relative with the co-operating mechanism, substantially as described.

35. In a machine for the production of glass articles, the combination with a blow-pipe carrying frame mounted to oscillate about a vertical axis, of a blow-pipe mounted in the frame to oscillate about a horizontal axis, means for positioning the frame and blow-pipe in their respective planes of oscillation to effect a gather of glass on the blow-pipes and for swinging the frame to a different position in its plane of oscillation to effect a treatment of the glass so gathered, substantially as described.

36. In a machine for the production of glass articles, the combination with a blow-pipe carrying frame mounted to oscillate about a vertical axis, of a blow-pipe mounted in the frame to oscillate about a horizontal axis, co-operating means adapted to operate upon the glass upon the blow-pipe to work the same and means for positioning the frame and the blow-pipe in their respective planes of oscillation to effect a gather of glass on the blow-pipe and for swinging the frame to a different position in its plane of oscillation to bring the blow-pipe into co-operative relation with the co-operating means, substantially as described.

37. In a machine for the production of glass articles, the combination with a travelling frame, of a blow-pipe carrying frame mounted therein to oscillate about a vertical axis, a blow-pipe mounted in the carrying frame to oscillate about a horizontal axis, cooperating mechanisms mounted on the travelling frame adapted to operate upon the glass upon the blow pipe to work the same, means actuated by the movement of the travelling frame for positioning the carrying frame and blow-pipes in their respective planes of oscillation to effect a gather of glass on the blow-pipe and for subsequently swinging the arm and blow-pipe to different positions in their respective planes of movement to cause the blow-pipe to co-operate with the co-operating mechanisms, substantially as described.

38. In a machine for the production of glass articles, the combination with a travelling frame, a blow-pipe supporting frame movably mounted thereon, a blow-pipe pivoted in the supporting frame, a marverer carried by the travelling frame, means for moving the blow-pipe supporting frame on the travelling frame to temporarily maintain the end of the blow-pipe stationary means for moving the pipe on its supporting frame to effect a gather, and means for subsequently moving the blow-pipe supporting grame on the travelling frame to effect a translatory movement of the blow-pipe as a whole and for oscillating the blow-pipe on the supporting frame to position the end of the blow-pipe into co-operative relation with the marverer, substantially as described.

39. In a machine for the production of glass articles, the combination with a travelling frame, a blow-pipe supporting frame pivoted thereto on a vertical pivot, a blow-pipe carried on the said blow pipe supporting frame by a horizontal pivot, a marverer, and means for moving the blow-pipe supporting frame on the travelling frame to temporarily maintain the end of the blow-pipe stationary, means to move the blow-pipe on the blow-pipe supporting frame to effect a gather and means for subsequently moving the blow-pipe supporting frame and the blow-pipe thereon to bring the end of the blow-pipe into co-operative relation with the marverer, substantially as described.

40. In a machine for the production of glass articles, the combination with a blow-pipe supporting frame, a blow-pipe pivoted in the supporting frame, a marverer, means for moving the blow-pipe supporting frame to position the end of the blow-pipe for gathering, and for moving the blow-pipe in its supporting frame, to effect a gather, and means for subsequently moving the blow-pipe suporting frame to effect a translatory movement of the blow-pipe as a whole and for oscillating the blow-pipe on the supporting frame to effect the marvering, substantially as described.

41. In a machine for the production of glass articles, the combination with a blow-pipe carrying frame, mounted to oscillate about a vertical axis, of a blow-pipe mounted in the frame to oscillate about a horizontal axis, a marverer mounted adjacent to the frame means for oscillating the frame and blow-pipe in their respective planes of oscillation to effect a gather of glass on the blow-pipe and for swinging the frame to a different position in its plane of movement to bring the plane of oscillation of the blow-pipe carried thereby into proper relation with the face of the marverer, substantially as described.

42. In a machine for the production of glass articles, the combination with a blow-pipe carrying frame mounted to oscillate about a vertical axis, of a blow-pipe mounted in the frame to oscillate about a horizontal axis, a marverer mounted adjacent to the frame, and means for moving the frame and blow-pipe in their respective planes of movement to effect a gather of glass on the blow-pipe, means for moving the arm to a different position in its plane of movement to bring the plane of oscillation of the blow-pipe carried thereby into proper relation with the face of the marverer and means for oscillating the blow-pipe in its new plane of movement to effect the marvering, substantially as described.

43. In a machine for the production of glass articles, the combination with a blow-pipe carrying frame mounted to move about a vertical axis, of a blow-pipe mounted in the frame to oscillate about a horizontal axis, means for positioning the frame and blow-pipe in their respective planes of movement to effect a gather of glass on the blow-pipe, and means for moving the frame in its plane of movement to effect a translatory movement of the blow-pipe as a whole and for swinging the blow-pipe in its plane of oscillation to effect the distribution and elongation of the gather, substantially as described.

44. In a machine for the production of glass articles, the combination with a blow-pipe carrying frame mounted to oscillate about a vertical axis, of a blow-pipe mounted in the frame to oscillate about a horizontal axis, a mold mechanism and means for positioning the frame and blow-pipe in their respective planes of oscillation to effect a gather of glass on the blow-pipe and means for moving the arm to effect a translatory movement of the blow-pipe as a whole and to bring the axis of the rotation thereof over the mold and for oscillating the blow-pipe in its plane of movement to place it vertically over the mold, substantially as described.

45. In a glass gathering and blowing machine, the combination with a travelling frame, a separable mold carried thereon, a blow-pipe carried on the frame by a horizontal axis capable of movement in the plane of travel of the frame independently of the movement of the frame, means for positioning the axis of the blow-pipe in the said plane and oscillating the blow-pipe thereon to effect a gather of glass and means for changing the position of the axis of the blow-pipe in the said plane to present the blow-pipe carried thereby over the mold and for oscillating the blow-pipe upon its pivot to present the blow-pipe vertically to the mold, substantially as described.

46. In a machine for the manufacture of blown glass articles, the combination with a marverer, of a movable blow-pipe supporting frame, a blow-pipe carried in the frame on a horizontal pivot, means for positioning the blow-pipe to effect a gather, means for moving the blow-pipe supporting frame to effect a translatory movement of the blow-pipe as a whole and to move the blow-pipe upon its horizontal pivot to position it in respect to the marverer, and means for effecting a further movement of the blow-pipe supporting frame to effect a translatory movement of the blow-pipe as a whole and to oscillate the blow-pipe upon its horizontal pivot to swing the marvered gather, substantially as described.

47. In a machine for the manufacture of blown glass articles, the combination of a marverer, of a blow-pipe supporting frame movable in a horizontal plane, a blow-pipe carried in the frame on a horizontal pivot, means for positioning the blow-pipe to effect a gather, means for positioning the blow-pipe supporting frame to effect a translatory movement of the blow-pipe as a whole and to move the blow-pipe upon its horizontal pivot to position it in respect to the marverer, and means for causing a further movement of the blow-pipe supporting frame to effect a translatory movement of the blow-pipe as a whole and to oscillate the blow-pipe upon its horizontal pivot to swing the marvered gather, substantially as described.

48. In a machine for the manufacture of blown glass articles, the combination with a mold and a marverer, of a movable blow-pipe supporting frame, a blow-pipe carried in the frame on a horizontal axis, and means for oscillating the blow-pipe on its axis and for moving the frame to effect a gather and to present the gather to the marverer and to the mold, substantially as described.

49. In a machine for the manufacture of blown glass articles, the combination with a mold and a marverer, of a movable blow-pipe supporting frame, a blow-pipe carried in the frame on a horizontal axis, means for oscillating the blow-pipe on its axis to effect a gather, means for moving the frame and oscillating the blow-pipe thereon to bring the blow-pipe and marverer into co-operative relation and means for effecting a further movement of the frame and blow-pipe thereon to present the blow-pipe vertically to the mold, substantially as described.

50. In a machine for the manufacture of blown glass articles, the combination with a travelling frame, a marverer and a molding mechanism carried thereon, a blow-pipe movably supported from the traveling frame, means for projecting the blow-pipe to effect a gather during a part of the movement of the frame and at a subsequent part of the movement of the frame for moving the blow-pipe to position it in respect to the marverer and molding mechanisms, substantially as described.

51. In a machine for the manufacture of glass articles, the combination with a mold, of a crack-off, of a movable blow-pipe frame, a blow-pipe carried therein on a horizontal axis, means for oscillating the pipe on its axis to effect a gather, and to hold the blow-pipe vertically for the molding and means for swinging the frame to present the pipe to the molten glass and to present it to the mold and crack-off, substantially as described.

52. In a machine for the manufacture of blown glass articles, the combination with a crack-off, a mold and a blow-pipe travelling in respect to the crack-off, the blow-pipe having also movement in respect to the mold, means for moving the blow-pipe in respect to the mold to effect a gather and for subsequently locating it into cooperating relation with the mold and with the crack-off, substantially as described.

53. In a machine for the manufacture of blown glass articles, the combination with a crack-off, a mold and a blow-pipe travelling in respect to the crack-off the blow-pipe being mounted for movement as a whole in a horizontal plane in respect to the mold and being pivoted on a horizontal axis, means for effecting a translatory movement of the blow-pipe in respect to the mold and on its pivot to effect a gather and to present the blow-pipe into co-operative relation with the mold and crank-off, substantially as described.

54. In a machine for the manufacture of blown glass articles, the combination with a crack-off, a travelling mold and a blow-pipe frame movable with the mold and also in respect thereto and mounted to swing on a horizontal axis, a blow-pipe carried in the frame, means for oscillating the blow-pipe frame on its horizontal axis to effect a gather and to hold the blow-pipe frame vertically, and means for moving the frame relatively to the mold to present the blow-pipe for gathering and to the mold and crack-off, substantially as described.

55. In a machine for the manufacture of blown glass articles, the combination with a crack-off, a frame travelling in respect thereto, a mold mounted in the said frame, a blow-pipe supporting frame mounted in the travelling frame and capable of movement thereon to effect a translatory movement of the blow-pipe as a whole, in respect to the mold, a blow-pipe mounted on the blow-pipe supporting frame on a horizontal axis and means for effecting a gather on the blow-pipe and for moving the blow-pipe supporting frame and turning the blow-pipe upon its horizontal axis to present it to the mold and crack-off, substantially as described.

56. In a machine for the manufacture of glass articles, the combination with a mold, of a blow-pipe supporting frame mounted upon a vertical pivot, a blow-pipe carried in the frame on a horizontal axis, means for oscillating the blow pipe on its axis to effect a gather and to swing the glass so gathered and to hold the blow-pipe vertically and means for moving the frame on its vertical pivot to present the blow-pipe to the molten glass, to position it for swinging and to present it to the mold.

57. In a machine for the manufacture of blown glass articles, the combination with molding and blowing mechanisms and a marverer, of a blow-pipe having a horizontal axis mounted to move in a horizontal plane, means for oscillating the blow-pipe on its horizontal axis to effect a gather of glass and to marver and swing the gather and position the blow-pipe vertically and means for moving the blow-pipe axis in a horizontal plane to position the blow-pipe for gathering and to present it to the marverer and to the mold, substantially as described.

58. In a machine for the manufacture of blown glass articles, the combination with a travelling frame, of molding and blowing mechanisms, and a marverer moving therewith, a blow-pipe supporting frame pivoted to the traveling frame to move in a horizontal plane, a blow-pipe horizontally pivoted in the blow-pipe frame, means for moving the blow-pipe frame to present the blow-pipe to molten glass, to properly align it with the marverer, and to present it to the mold, and means for oscillating the blow-pipe on its horizontal pivot to effect a gather, to marver, and swing the gather and to position the blow-pipe vertically.

59. In a machine for the manufacture of blown glass articles, the combination with a molding mechanism, of a frame mounted to oscillate in a horizontal plane, a blow-pipe pivoted in the said frame on a horizontal axis, a marverer, means for moving the frame and blow-pipe carried thereon to present the end of the latter to molten glass, means for moving the said frame to effect a translatory movement of the blow-pipe as a whole to properly align it with the marvering surface and to position it for swinging and in respect to the mold, and means for oscillating the blow-pipe on its horizontal pivot at proper times to swing the gather and locate the same adjacent to the mold, substantially as described.

60. In a machine for the manufacture of glass articles, the combination with a crack-off, of a travelling mold and a blow-pipe movable with the mold and also in respect thereto and mounted to swing on a horizontal axis, and means for oscillating the blow-pipe on its horizontal axis to effect a gather and to swing the gather and to hold the blow-pipe vertically for moving the blow-pipe relatively to the mold to present the blow-pipe for gathering and to the mold and crack-off, substantially as described.

61. In a machine for the manufacture of blown glass articles, the combination with a crack-off, and a moil cleaner, of a mold, a blow-pipe mounted for movement in respect to the crack-off, cleaner and mold, and means for projecting the blow-pipe to effect a gather and for then moving it in respect to the mold, crack-off and cleaner to properly present it thereto for successive co-operative action therewith, substantially as described.

62. In a machine for the manufacture of blown glass articles, the combination with a mold, a crack-off and a moil cleaner, of a movable blow-pipe supporting frame, a blow-pipe pivoted on the said frame, means for projecting the blow-pipe to effect a gather and for subsequently turning the blow-pipe upon the supporting frame to position it vertically, and means for moving the supporting frame to effect a translatory movement of the blow-pipe as a whole to position it for proper successive co-operative action with the mold, crack-off and cleaner, substantially as described.

63. In a machine for the manufacture of blown glass articles, the combination with a crack-off, and a cleaner mechanism, of a travelling mold, and a blow-pipe movable with the mold and also in respect thereto, and means for projecting the blow-pipe during the travel of the mold to effect a gather and for presenting it to the mold, crack-off and cleaner, substantially as described.

64. In a machine for the manufacture of blown glass articles, the combination with a movable mold, a blow-pipe movable therewith and also in respect thereto, means for moving the blow-pipe to effect a gather and to position it into co-operative relation with the mold, and a crack-off and a cleaner both of which are mounted for limited movement with the blow-pipe and co-operate therewith during such limited movement, substantially as described.

65. In a machine for the manufacture of blown glass articles, the combination with a travelling mold, of a blow-pipe movable therewith and also in respect thereto, and mounted to swing on a horizontal axis, means for oscillating the blow-pipe on its horizontal axis to effect a gather and to locate the blow-pipe vertically, means for moving the blow-pipe as a whole relatively to the mold to present it to the mold, and a crack-off and a cleaner both of which are brought into co-operative relation with the blow-pipe by the travel thereof and partake of the movement thereof during a limited period and co-operate therewith during such limited period, substantially as described.

66. In a machine for the manufacture of glass articles, the combination with a crack-off, of a travelling mold, a blow-pipe supporting frame movable with the mold and also in respect thereto, a blow-pipe carried in the support, a marverer movable with the mold, means for oscillating the blow-pipe to effect a gather, to marver and to swing the gather and to hold the blow-pipe vertically and means for moving the blow-pipe frame relative to the mold to present the blow-pipe for gathering, and to the marverer, the mold and crack-off, substantially as described.

67. In a machine for the manufacture of glass articles, the combination with a rotary frame, comprising a head and base, a series of blow-pipe frames pivoted to the head on vertical axes, a blow-pipe pivoted on each frame on a horizontal axis, a source of air under pressure and a series of air ports carried by the head, a series of marverers pivotally mounted on the head, a series of molds and mold mechanisms carried on the base, means for swinging each frame to project the blow-pipe carried thereby into a furnace and to position such blow-pipe in respect to the corresponding marverer and between the corresponding mold and air port, means for oscillating each of the blow-pipes on its pivot to effect a gather, and to swing the gather and present the blow-pipe vertically to the corresponding mold and a crack-off acting upon the blow-pipes carried by the several frames as the same are passed by it on the rotation of the frame, substantially as described.

68. In a machine for the manufacture of blown glass articles, the combination with a crack-off, of a moil cleaner, a travelling mold, a travelling marverer, a blow-pipe supporting frame movable with the mold and marverer and also movable in respect thereto, a blow-pipe pivoted in the supporting frame and means for oscillating the blow-pipe to effect a gather, to marver and to hold the blow-pipe vertical, and means for moving the blow-pipe frame relatively to the mold to present the blow-pipe for gathering and to the mold, marverer, crack-off and cleaner, substantially as described.

69. In a machine for the manufacture of blown glass articles, the combination with a crack-off, and a moil cleaner, of a mold and a marverer, a movable blow-pipe supporting frame, a blow-pipe pivoted therein, means for projecting the blow-pipe to effect a gather, means for oscillating the blow-pipe upon its pivot on the frame to swing the gather and place the blow-pipe vertical, and means for moving the movable blow-pipe supporting frame in respect to the mold and marverer to position the blow-pipe as a whole for marvering and in operative relation with the mold, crack-off and cleaner, substantially as described.

70. In a machine for the production of blown glass articles, the combination with a rotary frame, comprising a head and base, a series of blow-pipe frames pivoted to the head on vertical axes, blow-pipes pivoted on the said blow pipe frames on horizontal axes, a source of air under pressure and a series of air ports carried by the head, a series of marverers pivotally mounted in the head, a series of molds and mold mechanisms carried on the base, means for swinging each frame to project the blow-pipe carried thereby into a furnace and to position such blow-pipe in respect to the corresponding marverer and between the corresponding mold and air port, means for oscillating the blow-pipes on their pivots to effect gathering and to swing the gathers and present the blow-pipes vertically to the corresponding molds, a crack-off acting upon the blow-pipes carried by the several carriers as the same are passed by it on the rotation of the frame, and a moil cleaner acting upon the blow-pipes carried by the several carriers as the same are passed by it on the rotation of the frame after they have passed by the crack-off, substantially as described.

71. In a machine for the manufacture of blown glass articles, the combination with a crack-off, and a moil cleaner, of a mold and a marverer, a movable blow-pipe supporting frame, a blow-pipe pivoted therein, means for projecting the blow-pipe to effect a gather, means for oscillating the blow-pipe upon its pivot on the frame to marver, and swing the gather and place the blow-pipe vertical and means for moving the blow-pipe supporting frame in respect to the mold and marverer to position the blow-pipe as a whole for marvering and in operative relation with the mold, crack-off and cleaner, substantially as described.

72. In a machine for the manufacture of glass articles, the combination with a marverer, of a blow-pipe frame, a blow-pipe mounted on the frame on a horizontal axis, means for locating the frame to properly align the blow-pipe in respect to the marvering surface and means for moving the frame to effect a translatory movement of the blow-pipe as a whole and for swinging the blow-pipe on its horizontal axis when so moved and for rotating the blow-pipe when aligned with the marvering surface, substantially as described.

73. In a machine for the manufacture of glass articles, the combination with a marverer, of a blow-pipe frame, a blow-pipe mounted in the frame on a horizontal axis, means for locating the frame to properly align the blow-pipe in respect to the marvering surface and for oscillating the blow-pipe thereon to effect a marver, and means for subsequently moving the blow-pipe frame to effect a translatory movement of the blow-pipe as a whole and for swinging the blow-pipe on its horizontal axis, substantially as described.

74. In a machine for the manufacture of glass articles, the combination with a marverer, of a blow-pipe frame, a blow-pipe mounted in the frame on a horizontal axis, means for moving the frame to properly align the blow-pipe in respect to the marvering surface and means for oscillating the blow-pipe on its horizontal pivot to marver and swing the gather on the blow-pipe, substantially as described.

75. In a machine for the manufacture of blown glass articles, the combination with molding and blowing mechanisms and a marverer, of a blow-pipe supporting frame movable about a vertical axis, a blow-pipe horizontally pivoted in the frame, means for moving the frame from the position in which the blow-pipe aligns with the marvering surface, to present the blow-pipe to the mold and means for oscillating the blow-pipe on its horizontal pivot to position the blow-pipe vertically, substantially as described.

76. In a machine for the production of blown glass articles, the combination with a marverer, and with a mold, of a blow-pipe frame, a blow-pipe mounted on the frame on a horizontal axis, means for moving the frame from the position in which the blow-pipe is properly located in respect to the marvering surface for effecting a translatory movement of the blow-pipe as a whole and for turning the blow-pipe upon its horizontal axis to present it vertically to the mold, substantially as described.

77. In a machine for the manufacture of blown glass articles, the combination with a mold and a blowing mechanism, of a blow-pipe oscillating about a horizontal axis, a marverer, a supporting frame for the blow-pipe, means for moving the blow-pipe supporting frame from the position in which the blow-pipe is located in co-operative relation to the marverer to present the blow-pipe to the mold and means for oscillating the blow-pipe on its horizontal pivot to marver and swing the gather on the blow-pipe and position the blow-pipe vertically, substantially as described.

78. In a machine for the manufacture of blown glass articles, the combination with a traveling frame, a mold, and a marverer on the frame, a blow-pipe carrying frame pivoted to the travelling frame to oscillate the blow pipe in a horizontal plane, a blow-pipe pivoted on a horizontal axis on the blow-pipe frame, means for moving the carrying frame to properly align the blow-pipe with the marvering surface and to present it to the mold and means for oscillating blow pipe on its horizontal pivot to marver and swing the gather on the blow-pipe and position the blow-pipe vertically, substantially as described.

79. In a machine for the manufacture of blown glass articles, the combination of a mold, and a marverer, of a blow-pipe oscillating about a horizontal axis, a supporting frame for the blow-pipe movable about a vertical axis, means for moving the blow-pipe supporting frame from the position in which the blow-pipe is located in co-operative relation to the marverer, and for then oscillating the blow-pipe on its horizontal axis to swing and to position the blow-pipe vertically and means for effecting a further movement of the blow-pipe supporting frame to cause a translatory movement of the blow-pipe as a whole to position the blow-pipe above the mold, substantially as described.

80. In a machine for producing blown glass articles, the combination with a blow-pipe, a marverer, a separable mold, a source of air under pressure and means for moving the blow-pipe to bring it into co-operative position in relation to the marverer and mold, and to close the mold and to admit air into the blow-pipe, substantially as described.

81. In a machine for producing blown glass articles, the combination with a blow-pipe, a marverer, a separable mold, mechanism for admitting air to the blow-pipe, driving means and means actuated thereby for bringing the marverer and gather on the blow-pipe into contact, for moving the blow-pipe to swing the gather, for closing the mold and for admitting air into the blow-pipe, substantially as described.

82. The combination with a blowing mechanism and a separable mold, of a rotatable blow-pipe, a marverer, and an actuating mechanism and connections therefrom to automatically and successively bring the marverer and blow-pipe into co-operative relation, to swing the blow-pipe in a vertical plane and to present the end thereof to the mold and to close the mold, substantially as described.

83. The combination with a blowing mechanism and a separable mold, a marverer, a horizontally pivoted blow-pipe, and an actuating mechanism and connections therefrom to automatically and successively bring the marverer and blow-pipe into co-operative relation and to swing the support on its horizontal pivot to present the blow-pipe vertically to the mold and to close the mold, substantially as described.

84. In a machine for producing glass articles, the combination with a blow-pipe support, means for moving the support to lift the gathering end of the blow-pipe contained in such support above the opposite end thereof, to swing the gather and subsequently hold the blow-pipe vertically with the gather down, a marverer acting upon the gather when raised and a mold and its closing mechanism acting on the gather when lowered, substantially as described.

85. The combination with a blow-pipe, a mold, and a closing mechanism therefor, an actuating mechanism for the blow-pipe adapted to swing the blow-pipe to position the same vertically for elongating and molding and to then oscillate the blow-pipe to a raised position and a marverer, actuating mechanism therefor and mechanism for causing it to act upon the gather upon the blow-pipe prior to the swinging, substantially as described.

86. In a machine for the manufacture of blown glass articles, the combination with a crack-off, a travelling marverer, a travelling mold and a blow-pipe movable with the mold and also in respect thereto and mounted for movement on a horizontal axis, means for oscillating the blow-pipe on its horizontal axis to marver and hold the blow-pipe vertically and means for moving the blow-pipe as a whole relatively to the mold to present the blow-pipe for marvering and to the mold and crack-off, substantially as described.

87. In a machine for the manufacture of blown glass articles, the combination with a marverer, a mold and a crack-off, of a blow-pipe movable as a whole in respect thereto and also mounted to turn on a horizontal axis, means for turning the blow-pipe on its horizontal axis to present it vertically to the mold and means for moving the blow-pipe as a whole to present it to the marverer and crack-off, substantially as described.

88. In a machine for the production of blown glass articles, the combination with a crack-off, of a moil cleaner, a travelling mold, and a travelling marverer, a blow-pipe supporting frame, movable with the mold and marverer and also movable in respect thereto, a blow-pipe pivoted to the supporting frame and means for moving the blow-pipe upon its horizontal pivot from its marvering position to one in which it is vertical and means for moving the blow-pipe frame relatively to the mold to present the blow-pipe to the marverer, mold crack-off and cleaner, substantially as described.

89. In a machine for the manufacture of blown glass articles, the combination with a mold and an air mechanism and air port, a blow-pipe carrying frame mounted to move around a vertical axis, a blow-pipe mounted on a horiontal axis in the blow-pipe frame and means for oscillating the blow-pipe frame on its pivot to locate the blow-pipe thereon between the air port and the mold and to remove it therefrom and means for oscillating the blow-pipe on its horizontal axis to swing the gather and position the blow-pipe vertically over the mold, substantially as described.

90. In a machine for the manufacture of blown glass articles, the combination with a crack-off, of a travelling mold, a blow-pipe movable with the mold, and also in respect thereto and mounted to swing on a horizontal axis, means for oscillating the blow-pipe thereon to swing the gather and to locate the blow-pipe as a whole relative to the mold to present the blow-pipe to the mold and to the crack-off, substantially as described.

91. In a machine for the manufacture of blown glass articles, the combination with a crack-off, of a travelling frame, a separable mold and a blowing mechanism mounted thereon, a blow-pipe travelling with the said mold and relatively thereto and mounted to swing on a horizontal axis, means for oscillating the blow-pipe on such axis to swing the gather and means for moving the blow-pipe as a whole in respect to the travelling mold to position such blow-pipe for swinging and to locate it in co-operative relation to the blow-pipe and crack-off, substantially as described.

92. In a machine for the production of blown glass articles, the combination with a crack-off, and a moil cleaner, of a mold, a blow-pipe movable with the mold and also in respect thereto and mounted to swing on a horizontal axis, means for oscillating the blow-pipe thereon to swing the gather and to locate the blow-pipe vertically and means for moving the blow-pipe as a whole relatively to the mold to present the blow-pipe to the mold, crack-off and cleaner, substantially as described.

93. In a machine for the manufacture of glass articles, the combination with a mold and a blowing mechanism, of a blow-pipe carrying frame capable of moving in a horizontal plane, a blow-pipe pivoted to the said frame with a horizontal axis and means for moving the frame to present the blow-pipe over the mold and to remove it therefrom and means to oscillate the blow-pipe on its horizontal axis, substantially as described.

94. In a machine for the manufacture of blown glass articles, the combination with a mold and its actuating mechanism and with a blowing mechanism, of a blow-pipe carrying frame pivoted in a fixed relation to the mold and capable of movement in a horizontal plane around such pivot, a blow-pipe pivoted in the frame and means for moving the blow-pipe carrying frame from over the mold after the blowing, substantially as described.

95. In a machine for the manufacture of blown glass articles, the combination with a molding and blowing mechanism, of a blow-pipe mounted upon a horizontal axis, means for holding the blow-pipe in registration with the molding and blowing mechanisms and means for subsequently effecting a translatory movement of the blow-pipe as a whole to move the same from the mold, and means for swinging the blow-pipe upon its horizontal axis, substantially as described.

96. In a machine for the manufacture of blown glass articles, the combination with a mold and its actuating mechanism, and a crack off of a blow-pipe and means for moving the blow-pipe to present the blow-pipe thereon to the mold and to the crack-off, substantially as described.

97. In a machine for the production of blown glass articles, the combination with a travelling blow-pipe, of a mold and its actuating mechanism, of means for moving the blow-pipe to present it to the mold, and a crack-off mechanism, into co-operative relation with which the blow-pipe is brought by its travel, substantially as described.

98. In a machine for the production of blown glass articles, the combination with a crack-off, a mold movable in respect to the crack-off, a blow-pipe movable in unison with the mold and also in respect thereto and means for moving the blow-pipe to present the gather carried thereon to the mold and to the crack-off, substantially as described.

99. In a machine for the manufacture of blown glass articles, the combination with a travelling mold and a blow-pipe, of a crack-off movable with the blow-pipe during a part of its travel and co-operating therewith during such period, substantially as described.

100. In a machine for the manufacture of blown glass articles, the combination with a travelling mold and a blow-pipe, of a crack-off and a moil cleaner both movable with the blow-pipe during parts of the travel of the latter and co-operating therewith during such periods, substantially as described.

101. In a glass gathering machine, the combination with a pivoted blow-pipe, a cam controlling the vertical movement of the end of the blow-pipe and having a movable section to regulate the extent of the drop of that end of the blow-pipe and a second movable section to regulate the duration of the drop, substantially as described.

102. In a glass gathering machine, the combination with a pivoted blow-pipe, a cam plate having a track therein controlling the vertical motion of the end of the blow-pipe, the said track being formed in part of a removable section to regulate the extent of the drop of that end of the blow-pipe and in part of removable sections to regulate the time of drop and the lift of the blow-pipe, substantially as described.

103. In a machine for producing blown glass articles, the combination with a blow-pipe, a marverer, a separable mold, a source of air under pressure and means for moving the blow-pipe in a vertical plane, to bring the blow-pipe into operative position in relation to the marverer and mold, for closing the mold and for admitting air into the blow-pipe, substantially as described.

104. The combination with blowing and molding mechanisms, of a blow-pipe, a marverer, a motor and means actuated thereby, for rotating the blow-pipe upon its longitudinal axis and with its end adjacent to the marverer, for swinging the blow-pipe and for presenting the end thereof to the molding mechanism.

105. In a machine for producing glass articles, the combination with a blow-pipe, a marverer and means for presenting the blow-pipe to the marverer with the gather end thereof raised above the opposite end.

106. In a machine for producing glass articles, the combination with a blow-pipe, of a mold, a marverer and a motor and means actuated thereby for moving the blow-pipe to lift the gathering end thereof to marver, to swing the gather and to present it vertically to the mold.

107. In a machine for producing glass articles, the combination with a blow-pipe, means for moving the blow-pipe to lift the gathering end of the blow-pipe above the opposite end thereof, to swing the gather and subsequently hold the blow-pipe vertically with the gather down, a marverer acting upon the gather when raised, a mold acting on the gather when lowered and closing mechanism for the mold.

108. In a machine for the manufacture of blown glass articles, the combination with a marverer, of means for moving the glass from which the article is to be blown in contact with a vertical face of the marverer.

109. In a machine for the manufacture of blown glass articles, the combination with a marverer, of means for rolling the glass from which the article is to be blown along a vertical face of the marverer.

110. In apparatus of the character described, the combination with supporting means and a cam, one of the same being adapted to revolve and the other of which is stationary, a gathering device mounted so as to oscillate on said supporting means, means actuated by said cam for causing said gathering means to oscillate, the said gathering device being hollow, and means whereby compressed air may be admitted to the interior of the same.

111. In apparatus of the character described, the combination with supporting means, of a gathering device comprising a hollow casing mounted so as to oscillate on said supporting means, a spindle within said casing and projecting therefrom, said spindle provided with a bore communicating with the interior of said casing, a tubular gathering member which extends into said bore, means for securing said gathering member to said spindle, means for revolving said spindle within said casing, and means whereby compressed air may be admitted to the interior of said casing.

112. The combination with a glass pot, of a gathering blow-pipe, means for moving one of said elements past the other, means for oscillating said blow-pipe in a plane transverse to said line of movement, whereby it is caused to enter and to leave the glass in the pot, means for rotating the blow-pipe while in the pot, and means for expanding the metal so gathered, while on the blow-pipe.

113. The combination with a glass pot, of mechanism arranged to rotate about a vertical axis in front of said pot, said mechanism comprising a blow-pipe, means for oscillating said blow-pipe in a vertical plane, whereby it is dipped into and out of the glass pot, means for rotating the blow-pipe while in the glass pot, to gather metal, and means for blowing the metal so gathered, while on said blow-pipe.

114. In apparatus of the character described, the combination with a glass pot, of a gathering device, a marver, means for axially revolving the gathering device, means for dipping the gathering device into the glass pot, withdrawing it therefrom and moving it so that the glass collected thereon is brought into contact with the marver, and means for tilting the marver.

115. In apparatus of the character described, the combination with a glass pot, of a revoluble gathering device, a marver and a mold, and actuating mechanism which causes the gathering device to enter the glass in the glass pot, moves said gathering device so as to bring the glass collected thereon into contact with the marver, thereafter causes said gathering device to be swung back and forth with the glass collected thereon downward and then brings said gathering device in position to be enclosed by said mold.

116. In apparatus of the character described, the combination with a glass pot, of a gathering device, a marver and a mold, actuating mechanism which causes the gathering device to enter the glass in the glass pot, moves said gathering device so as to bring the glass collected thereon into contact with the marver, thereafter causes said gathering device to be swung back and forth with the glass collected thereon downward and then brings said gathering device in position to be enclosed by said mold, and mechanism for causing said gathering device to revolve.

117. In apparatus of the character described, the combination with a glass pot, of a revoluble gathering device, a marver and a mold, actuating mechanism which causes the gathering device to enter the glass in the glass pot, moves said gathering device so as to bring the glass collected thereon into contact with the marver, thereafter causes said gathering device to be swung back and forth with the glass collected thereon downward and then brings said gathering device in position to be enclosed by said mold, said gathering device constructed so as to admit compressed air to the body of glass collected thereon.

118. In apparatus of the character described, the combination with a glass pot, of a revoluble gathering device, a marver and a mold, actuating mechanism which causes the gathering device to enter the glass in the glass pot, moves said gathering device so as to bring the glass collected thereon into contact with the marver, thereafter causes said gathering device to be swung back and forth with the glass collected thereon downward and then brings said gathering device in position to be enclosed by said mold, and means for tilting marver.

119. In apparatus of the character described, the combination with a glass pot, of an axially revoluble gathering device which is mounted so as to oscillate, means for dipping the same into and removing the same from the glass pot, a marver and means for swinging the gathering device so that the glass collected on the same is brought into contact with the marver, means for causing said gathering device to be oscillated back and forth with the glass collected thereon downward, a mold adapted to enclose the glass on said gathering device when the latter is in vertical position, and means for swinging said gathering device out of vertical position.

120. In apparatus of the character described, the combination with a glass pot, of a gathering device which is mounted so as to oscillate, means for dipping the same into and removing the same from the glass pot, a marver, means for swinging the gathering device so that the glass collected on the same is brought into contact with the marver, means for causing said gathering device to be oscillated back and forth with the glass collected thereon downward, a mold adapted to enclose the glass on said gathering device when the latter is in vertical position, means for swinging said gathering device out of vertical position, and mechanism for revolving the gathering device.

121. In apparatus of the character described, the combination with a glass pot, of an axially revoluble gathering device which is mounted so as to oscillate, means for dipping the same into and removing the same from the glass pot, a marver, and means for swinging the gathering device so that the glass collected on the same is brought into contact with the marver, means for causing said gathering device to be oscillated back and forth with the glass collected thereon downward, a mold adapted to enclose the glass on said gathering device when the latter is in vertical position, means for swinging said gathering device out of vertical position, and means for tilting the marver.

122. In apparatus of the character described, the combination with a glass pot, of an axially revoluble gathering device which is mounted so as to oscillate, means for dipping the same into and removing the same from the glass pot, a marver and means for swinging the gathering device so that the glass collected on the same is brought into contact with the marver, means for causing said gathering device to be oscillated back and forth with the glass collected thereon, a mold adapted to enclose the glass on said gathering device when the latter is in vertical position, and means for swinging said gathering device out of vertical position, said gathering device being constructed so as to admit air into the body of glass thereon.

123. In apparatus of the character described, the combination with a movable gathering device, of a stationary glass pot, a marver which moves with said gathering device, a mechanism for dipping the gathering device into the glass pot and then bringing the gathering device and marver together so that the body of glass collected on the former comes into contact with the latter and means for revolving the gathering device.

124. In apparatus of the character described, the combination with a movable gathering device, of a stationary glass pot, a marver which moves with said gathering device, a mechanism for dipping the gathering device into the glass pot and then bringing the gathering device and marver together so that the body of glass collected on the former comes into contact with the latter, and means for axially revolving the gathering device.

125. In apparatus of the character described, the combination with a movable gathering device, of a stationary glass pot, a marver which moves with said gathering device, a mechanism for dipping the gathering device into the glass pot and then bringing the gathering device and marver together so that the body of glass collected on the former comes into contact with the latter, means for revolving the gathering device and mechanism for oscillating the gathering device back and forth with the body of glass downward.

126. The combination with blowing and molding mechanisms, of a blow-pipe receiving device and a motor and means driven thereby for moving the blow-pipe receiving device to present the blow-pipe carried by the receiving device to the blowing and molding mechanisms and swing the gather.

127. In a glass working machine, the combination with blowing and molding mechanisms, of a blow-pipe receiving device, translating mechanism for moving the blow-pipe receiving device to present the blow-pipe to the blowing and molding mechanisms, and means for swinging the blow-pipe by rotating the blow-pipe receiving device about a horizontal axis.

128. In a glass working machine, the combination with blowing and molding mechanisms and a marverer, of a blow-pipe receiving device, translating mechanism for moving the blow-pipe receiving device to present the blow-pipe to the marverer, and then to the blowing and molding mechanisms, and means for swinging the blow-pipe by rotating the blow-pipe receiving device about a horizontal axis.

129. In a glass working machine, the combination with blowing and molding mechanisms, of a blow-pipe and blow-pipe supporting device, means for presenting the blow-pipe to molten glass and subsequently translating the same and presenting it to the blowing and molding mechanism.

130. In a glass working machine, the combination with blowing and molding mechanism, of a blow-pipe and blow-pipe receiving device, translating mechanism for the blow-pipe receiving device adapted to present the blow-pipe to molten glass and to the blowing and molding mechanisms and means for swinging the blow-pipe by rotating the blow-pipe receiving device upon a horizontal axis.

131. In a glass working machine, the combination with blowing and molding mechanisms, of a blow-pipe and blow-pipe receiving device, translating mechanisms for the blow-pipe receiving device adapted to present the blow-pipe to molten glass and to the blowing and molding mechanisms and to hold it stationary in each of such positions and means acting on the blow-pipe receiving device to swing the blow-pipe on a horizontal axis between gathering and blowing positions.

132. In a glass working machine, the combination with blowing and molding mechanisms, of a blow-pipe and blow-pipe receiving device, a translating mechanism for the blow-pipe receiving device adapted to present the blow-pipe to molten glass and to the blowing and molding mechanisms, and means acting on the blow-pipe receiving device to swing the blow-pipe in a vertical plane and for rotating the blow-pipe.

133. In a glass working machine, the combination with blowing and molding mechanisms, a blow-pipe and a blow-pipe receiving device, of means for translating the blow-pipe receiving device in a vertical plane and presenting the blow-pipe to molten glass and to the blowing and molding devices, means for swinging the blow-pipe in a vertical plane upon a horizontal axis and means for rotating the blow-pipe around its own axis.

134. In a machine for the production of glass articles, the combination with a travelling frame, of a marverer and a molding mechanism, a blow-pipe movably supported from the travelling frame, means for projecting the blow-pipe to effect a gather during a part of the movement of the frame, for moving the blow-pipe to position it in respect to the marverer and molding mechanisms, substantially as described.

135. In a machine for the manufacture of glass articles, the combination with a marverer, of a blow-pipe frame, a blow-pipe mounted in the frame on a horizontal axis, means for locating the frame to properly align the blow-pipe in respect to the marvering surface and means for moving the frame to effect a translatory movement of the blow-pipe as a whole and for swinging the blow-pipe on its horizontal axis when so moved, substantially as described.

136. In a machine for the manufacture of blown glass articles, the combination with a travelling frame, of a mold and a marverer, a blow-pipe carrying frame pivoted to the travelling frame to oscillate in a horizontal plane, a blow-pipe pivoted on a horizontal axis on the blow-pipe frame, means for moving the carrying frame to properly align the blow-pipe with the marvering surface and to present it to the mold and means for oscillating the blow-pipe frame on its horizontal pivot to marver and swing the gather on the blow-pipe and position the blow-pipe vertically, substantially as described.

137. In a glass blowing machine, the combination with a mold, of means for opening and closing the mold, a movable blow-pipe carrier having a position of rest with the blow-pipe thereon in alignment with the mold for molding, and means for moving the carrier to remove the blow-pipe with the blown article thereon away from the mold, substantially as described.

138. In a machine for the production of glass articles, the combination with a support, having a movement from one position to another position in the same horizontal plane, of a blow-pipe carried thereby and movable in respect to the support and in the direction of movement thereof.

139. In a glass working machine, the combination with a continuously rotating frame, a gatherer mounted upon said frame, a blowing mechanism mounted upon the said frame, and a mold mechanism mounted upon the said frame, and means actuated during the travel of the frame to move the gatherer to effect a gather of glass, to position the glass so gathered in operative relation to the mold, and for blowing the glass therein.

140. In apparatus of the character described, the combination with supporting means, of a gathering device mounted thereon comprising an axially revoluble gathering member, a circular rack around which said supporting means is adapted to be moved, and mechanism for revolving said gathering member comprising a pinion meshing with said rack and a driving connection between said pinion and said gathering member.

141. The combination with a carrier for a mass of glass, of a marverer, of automatic means for causing a predetermined relative movement between the carrier and a face of the marverer, whereby the glass is marvered, and automatic means for swinging said carrier with the marvered glass thereon in a vertical plane through predetermined oscillations to "swing" the marvered glass, and means for automatically bringing said carrier with the glass thereon to rest at a fixed point.

142. In a machine for the manufacture of glass articles, the combination with a glass carrier having a horizontal pivotal mounting, a support for the pivot of the carrier mounted to move from one position to another position in the same horizontal plane, a motor, and means driven thereby in a predetermined order and time to effect a translatory movement of the carrier as a whole and to move the carrier with the glass thereon through predetermined oscillations about its horizontal axis to "swing" the glass.

143. The combination with a rotary support having a constant angular speed, of a gatherer moving around the same axis as the support, mechanism mounted on this rotating support, and co-operating with the gatherer, and means for causing a periodic variation in the angular movement of the gatherer whereby it has at times a negative, and at other times, a positive movement in respect to the co-operating mechanism and is at other times moving in unison therewith.

144. The combination with a rotary support having a constant angular speed, of a gatherer moving around the same axis as the support, mechanism mounted on the rotating support and co-operating with the gatherer, and means for temporarily retarding the motion of the gatherer, for moving the same with an angular velocity in excess of that of the co-operating mechanism, and then with a velocity the same as that of the co-operating mechanism.

145. In apparatus of the character described, the combination with supporting means having a circular movement, of a gathering device mounted thereon so as to oscillate comprising an axially revoluble gathering member, means for oscillating said gathering device comprising a stationary cam and mechanism connected with said gathering device which is actuated by contact with said cam, and means for revolving said gathering member comprising a circular rack and driving mechanism operated from said rack.

146. In apparatus of the character described, the combination with a glass pot, of a gathering device, a mold adapted to enclose the body of glass on the gathering device, mechanism which causes the gathering device to enter the body of glass in the glass pot and collect a portion of said glass and which thereafter moves said gathering device into such position that the glass thereon may be enclosed by said mold and means for blowing the glass while in the mold.

147. The combination with a moving support, of a gathering mechanism carried thereby and movable thereon and adapted to collect a gather of glass at one end thereof, of means for automatically retarding and accelerating the travel of the gathering mechanism with respect to the support.

148. In apparatus of the character described, the combination with a glass pot, of an oscillating and axially revoluble gathering device, a marver, the glass pot being below the level of the axis of oscillation of the gathering device and the marver being on substantially the same level with said axis of oscillation, and means for first causing the gathering device to be dipped into the glass pot and thereafter turned in the opposite direction so as to bring the glass collected thereon in contact with the marver.

149. The combination with a carrier for a mass of glass, of means for rotating said carrier around its longitudinal axis, automatic means for moving said carrier around another axis in oscillations predetermined in amplitude, number and velocity to "swing" the glass, and means for automatically admitting air into the glass during the movement of the carrier around either axis.

150. In a machine for producing glass articles, the combination with a blow-pipe, of means for rotating the blow-pipe, a marvering part, and means for automatically causing the distance between the blow-pipe and a surface of the marvering part to vary during the marvering in a predetermined manner.

151. The combination with a moving support, of a plurality of gathering mechanisms carried thereby and independently movable thereon, each adapted to collect a gather of glass at one end thereof, and means for automatically retarding the travel of the gathering end of each of such gathering mechanisms in respect to such support to effect a gather of glass without retardation of the ends of the other gathering mechanisms, and without retarding the movement of said support.

152. The combination with a moving support, of a plurality of gathering mechanisms carried thereby and independently movable thereon, and means for automatically and independently retarding the travel of each gathering mechanism in respect to such support to effect a gather of glass without retarding the movement of the other gathering mechanisms or of said support.

153. In a machine for producing glass articles, the combination with a blow-pipe, of a marverer, means for producing a marvering action between the gather and the marverer, and means for automaticaly causing the distance between the marverer and the axis of the blow-pipe to vary during the marvering in a predetermined manner.

154. The combination with a blow-pipe, of a marverer, means for imparting a rotary movement to the blow-pipe and means for varying the position of the marverer in relation to the plane of rotation of the blow-pipe while it is in operative relation with the blow-pipe.

155. In apparatus of the character described, the combination with a glass pot, of a' gathering device, a mold adapted to enclose the body of glass on the gathering device, mechanism which causes the gathering device to enter the body of glass in the glass pot and collect a portion of said glass and which thereafter moves said gathering device into such position that the glass thereon may be enclosed by said mold, means for blowing the glass while in the mold and means for revolving said gathering device in the mold.

156. In apparatus of the character described, the combination with a glass-working spindle adapted to carry a solid mass of glass thereon, of a marvering part, means for moving the spindle to position the solid mass of glass adjacent to the marvering part and for rotating the spindle and means for moving the marvering part so as to cause the surface thereof to approach the axis of the spindle.

157. In a glass-working machine, the combination with a traveling marverer, of means for supporting a glass-carrying spindle in proximity thereto and means for reducing at a predetermined rate, the distance between the axis of the spindle and the marvering face.

158. The combination with an oscillating blow-pipe, of means for rotating the blow-pipe, a marverer mounted to move to various inclinations in respect to the plane in which the blow-pipe oscillates and means for simultaneously oscillating the blow-pipe and varying the inclinations of the marverer, substantially as described.

159. In apparatus of the character described, the combination with a gathering device mounted so as to oscillate, of a marver, mechanism for oscillating the gathering device so as to bring the body of glass collected thereon into contact with the marver, mechanism for revolving the gathering device, and mechanism for shifting the angular position of the marver while the glass is in contact therewith.

160. In apparatus of the character described, the combination with supporting means, of a marver pivoted thereon, a cam, means operated by said cam for tilting said marver, a gathering device mounted on said supporting means, and means for moving said gathering device so as to bring the body of glass collected thereon into contact with the marver.

161. In apparatus of the character described, the combination with movable supporting means, of a tilting marver thereon, means set in operation at a predetermined point in the travel of said supporting means for tilting said marver, a gathering device on said supporting means, and means for moving said gathering device so as to bring the body of glass collected thereon into contact with said marver.

162. In apparatus of the character described, the combination with movable supporting means, of a tilting marver thereon, a stationary cam, means adapted to be engaged by said cam for tilting said marver, a gathering device on said supporting means, and means for moving said gathering device so as to bring the body of glass collected thereon into contact with said marver.

BENJAMIN D. CHAMBERLIN.